(12) United States Patent
Yamada et al.

(10) Patent No.: US 7,813,275 B2
(45) Date of Patent: Oct. 12, 2010

(54) WIRELESS COMMUNICATION DEVICE, A WIRELESS COMMUNICATION SYSTEM AND A WIRELESS COMMUNICATION METHOD

(75) Inventors: Akira Yamada, Yokohama (JP); Atsushi Fujiwara, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 171 days.

(21) Appl. No.: 11/212,785

(22) Filed: Aug. 29, 2005

(65) Prior Publication Data

US 2006/0056382 A1 Mar. 16, 2006

(30) Foreign Application Priority Data

Sep. 1, 2004 (JP) ............................... 2004-254595
May 27, 2005 (JP) ............................... 2005-156395

(51) Int. Cl.
*H04J 1/16* (2006.01)
(52) U.S. Cl. ........................ 370/230; 370/229; 370/231; 370/338; 370/351; 370/412; 709/230; 709/231; 709/235; 709/238; 455/452.1; 455/452.2; 455/453
(58) Field of Classification Search ................. 370/328, 370/341, 351, 392, 395.31, 412–418, 443, 370/444, 445, 229, 230, 230.1, 235, 349, 370/352, 329, 338, 252, 389, 395.41, 395.42, 370/231, 232, 236, 237, 390, 400, 233, 234, 370/238, 431, 447; 709/235, 238, 230, 231; 455/452.1, 452.2, 453
See application file for complete search history.

(56) References Cited

U.S. PATENT DOCUMENTS

| | | | | |
|---|---|---|---|---|
| 6,438,135 | B1 * | 8/2002 | Tzeng | 370/412 |
| 6,452,933 | B1 * | 9/2002 | Duffield et al. | 370/415 |
| 6,618,378 | B1 * | 9/2003 | Giroux et al. | 370/395.1 |
| 7,002,911 | B1 * | 2/2006 | Linville et al. | 370/230 |

(Continued)

FOREIGN PATENT DOCUMENTS

JP 9-205431 8/1997

(Continued)

OTHER PUBLICATIONS

Fusao Nuno, et al. "Performance Evaluation of QOS Control Scheme That Uses Back Pressure Traffic Control", PIMRC2004, 2004, vol. 2, pp. 830-834.

(Continued)

*Primary Examiner*—Charles N Appiah
*Assistant Examiner*—Olumide T Ajibade Akonai
(74) *Attorney, Agent, or Firm*—Oblon, Spivak, McClelland, Maier & Neustadt, L.L.P.

(57) ABSTRACT

A wireless communication device, a wireless communication system and a wireless communication method for preventing buffer over flow in the wireless communication device acting as a relay node, and for improving throughput within the whole system are disclosed. The wireless communication device includes an information acquisition unit configured to acquire information on the amount of data relay processing in the wireless communication device and/or a neighbor wireless communication device; a priority calculation unit configured to calculate transmission priority of the wireless communication device, based on the acquired information; and a priority determination unit configured to determine a priority related parameter for data transmission from the wireless communication device, based on the transmission priority.

12 Claims, 28 Drawing Sheets

U.S. PATENT DOCUMENTS

| | | | |
|---|---|---|---|
| 7,003,302 B2* | 2/2006 | Yoshida et al. | 455/450 |
| 7,047,310 B2* | 5/2006 | Bedekar et al. | 709/232 |
| 7,062,568 B1* | 6/2006 | Senevirathne et al. | 709/234 |
| 7,075,890 B2* | 7/2006 | Ozer et al. | 370/230 |
| 7,110,359 B1* | 9/2006 | Acharya | 370/235 |
| 7,245,946 B2* | 7/2007 | Liu | 455/574 |
| 7,483,373 B2* | 1/2009 | Willey et al. | 370/231 |
| 2002/0039369 A1* | 4/2002 | Koo | 370/449 |
| 2002/0059408 A1* | 5/2002 | Pattabhiraman et al. | 709/223 |
| 2002/0154653 A1 | 10/2002 | Benveniste | |
| 2002/0159460 A1* | 10/2002 | Carrafiello et al. | 370/392 |
| 2003/0058802 A1* | 3/2003 | Jones et al. | 370/252 |
| 2003/0081603 A1* | 5/2003 | Rune | 370/390 |
| 2003/0169746 A1* | 9/2003 | Kitazawa et al. | 370/395.42 |
| 2004/0078478 A1* | 4/2004 | Yahagi | 709/233 |
| 2004/0125815 A1* | 7/2004 | Shimazu et al. | 370/411 |
| 2004/0257995 A1* | 12/2004 | Sandy et al. | 370/235 |
| 2004/0258070 A1* | 12/2004 | Arima | 370/395.4 |
| 2005/0041591 A1* | 2/2005 | Duggi et al. | 370/238 |
| 2005/0059417 A1* | 3/2005 | Zhang et al. | 455/515 |
| 2005/0111361 A1* | 5/2005 | Hosein | 370/230 |
| 2005/0185583 A1* | 8/2005 | Hosein | 370/232 |
| 2005/0207419 A1* | 9/2005 | Kohzuki et al. | 370/392 |
| 2005/0220097 A1* | 10/2005 | Swami et al. | 370/389 |
| 2008/0285507 A1* | 11/2008 | Mukherjee et al. | 370/329 |

FOREIGN PATENT DOCUMENTS

WO     01/95641 A2     12/2001

OTHER PUBLICATIONS

"A Compilation Based on IEEE Std 802.11™-1999 (R2003) and Its Amendments", IEEE Wireless LAN Edition, Aug. 2004, 706 pages.

" IEEE Standard for Information Technology, Telecommunications and Information Exchange Between Systems, Local and Metropolitan Area Networks, Specific Requirements, Part 11: Wireless Medium Access Control (MAC) and Physical Layer (PHY) Specifications: Amendment 7: Medium Access Control (MAC) Quality of Service (QoS) Enhancements"; IEEEP 802.11e/D9.0; Aug. 2004, 208 pages.

Stefan Mangold, et al., "IEEE 802.11e Wireless LAN for Quality of Service", URL: http://comnets.rwth-aachen.de/cnroot.html>, Internet Citation, XP002251598, retrieved on Aug. 18, 2003, 8 pages.

Gahng-Seop Ahn, et al., Supporting Service Differentiation for Real-Time and Best-Effort Traffic in Stateless Wireless Ad Hoc Networks (SWAN), IEEE Transactions on Mobile Computing, vol. 1, No. 3, XP011095348, Jul.-Sep. 2002, pp. 192-207.

* cited by examiner

TERMINAL

FIG.21
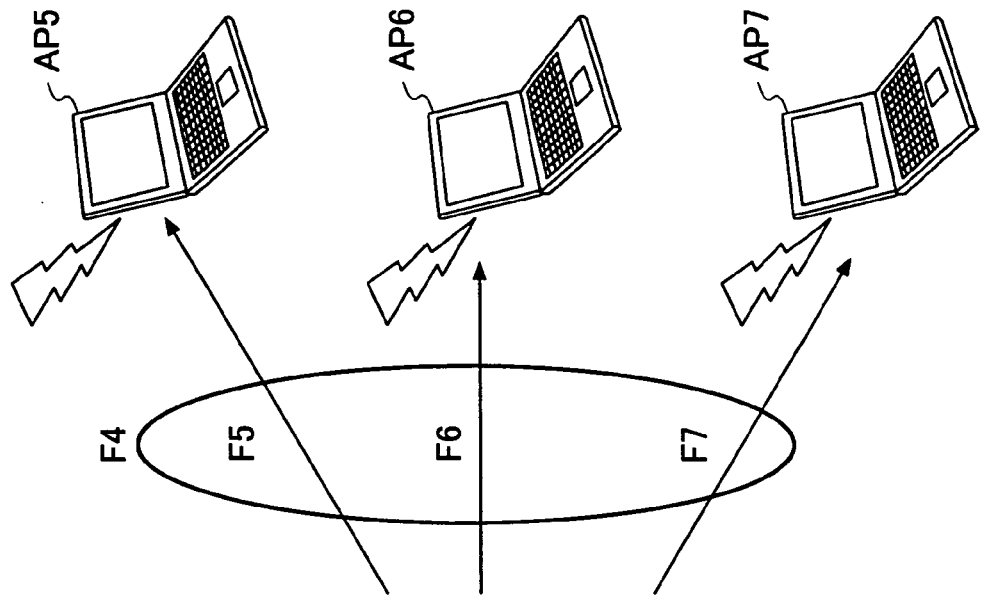
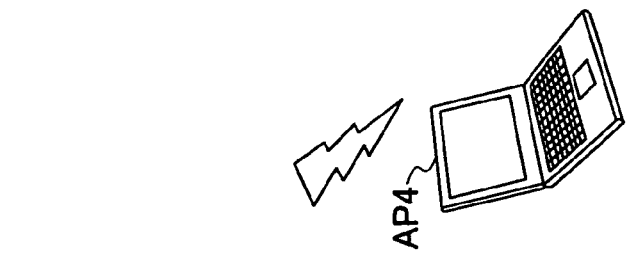
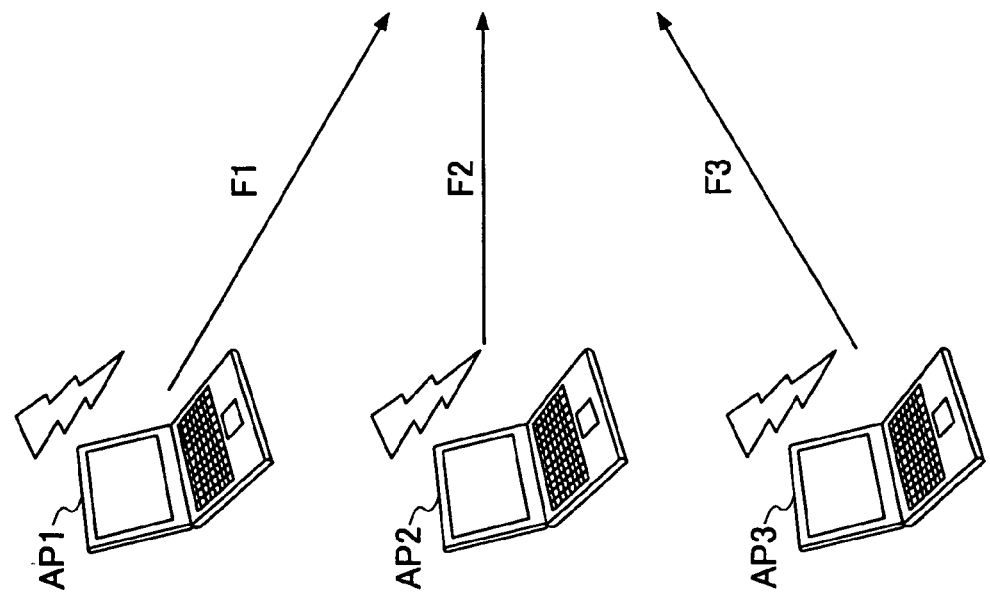

US 7,813,275 B2

WIRELESS COMMUNICATION DEVICE, A WIRELESS COMMUNICATION SYSTEM AND A WIRELESS COMMUNICATION METHOD

BACKGROUND OF THE INVENTION

1. Field of the Invention

The present invention relates to a wireless communication device, a wireless communication system and a wireless communication method for reducing data packets remaining in a relay node, and for equally setting end-to-end throughput for each link within a wireless ad-hoc network.

2. Description of the Related Art

A wireless ad-hoc network system allows each of plural wireless communication devices (access points or nodes) to communicate data with the other wireless communication devices within a predetermined coverage area, without a centralized control station such as a base station for a mobile phone system. Also, it allows each of the wireless communication devices to communicate data over a long distance by relaying data from a source wireless communication device to a destination wireless communication device.

FIG. 1 shows a typical wireless ad-hoc network system. Access Points AP1-AP4 are wireless communication devices each functioning as an access point. A wireless ad-hoc network is categorized into an ad-hoc based network and a mesh based network. The ad-hoc based network is composed of wireless LAN terminals only, as shown in FIG. 2. The mesh based network is composed of wireless LAN base stations and wireless LAN terminals, as shown in FIG. 3. As used herein, "a wireless ad-hoc network system" includes both the ad-hoc based network and the mesh based network. The access points AP1-AP4 in FIG. 1 correspond to the wireless LAN terminals in FIG. 2 or the wireless LAN base stations in FIG. 3. If the wireless LAN terminals in FIG. 3 include a relay function, they are included in the access points.

In FIG. 1, when one of the access points (nodes) is located so as to communicate data (transfer packets) with the neighbor access points, the access point can communicate data directly with its neighbor access points within its coverage area. That is, data can be communicated directly between AP1 and AP2, between AP2 and AP3, and between AP3 and AP4. On the other hand, each of the access points can communicate data indirectly with its non-neighbor access points via intermediate access points. That is, data can be communicated indirectly via the intermediate access points between AP1 and AP4, between AP1 and AP3, and between AP2 and AP4. It is noted that around each of the access points AP1-AP4, there may be terminals (stations) without the relay function, and the terminals may communicate via the access points AP1-AP4.

FIGS. 4(a) and (b) show examples of data transmission in accordance with IEEE 802.11, one of the wireless LAN standards. The collision avoidance for the data transmission is based on so-called virtual carrier sense. (See Non-Patent Reference 1, for example, which discloses a wireless LAN system comprising a base station and a terminal.)

In FIG. 4(a), when the access point AP1 attempts to send data to the access point AP2, the access point AP1 sends the data after a predetermined period called DIFS (Distributed Inter Frame Space) and a random Backoff time (Step S01). In response to the data, the access point AP2 sends an ACK (ACKnowledgement) packet (Step S02).

In FIG. 4(b), when the access point AP1 attempts to send data to the access point AP2, the access point AP1 sends a RTS (Request To Send) packet indicating the following data transmission, after the predetermined perid DIFS and the random Backoff time, prior to sending the data (Step S1). In response to the RTS packet, the access point AP2 returns a CTS (Clear To Send) packet which allows the data transmission (Step S2). In response to the CTS packet, the access point AP1 sends data (Step S3), and then access point AP2 returns an ACK packet after receiving the data (Step S4). This CTS/CTS mechanism is able to solve a hidden terminal problem.

According to the approach shown in FIGS. 4(a) and (b), the number of data transmissions is limited even if the access point transmits data continuously (not interrupted by another access point data transmission), because the waiting period for Backoff is required for each data transmission.

FIGS. 5(a) and (b) show examples of data transmission in accordance with IEEE 802.11e. A TXOP (Transmission Opportunity) is introduced for QoS (Quality of Service) support and improved efficiency (See Non-Patent Reference 2, for example). In FIG. 5(b), the RTS/CTS is exchanged when the hidden terminal problem mentioned in FIG. 4(b) is happening.

In FIG. 5(a), when the access point AP1 attempts to send data to the access point AP2, the access point AP1 sends a data transmission after the predetermined period DIFS and the random Backoff time (Step S011). In response to the data transmission, the access point AP2 sends the ACK packet as well. However, the access point AP1 can send the next data transmissions continuously during a predetermined duration called "TXOP Limit", upon receiving the ACK packet from the access point AP2.

In FIG. 5(b), when the access point AP1 attempts to send data to the access point AP2, the access point AP1 sends the RTS packet to the access point AP2 (Step S11). In response to the RTS packet, the access point AP2 returns the CTS packet which allows the data transmission (Step S12), and then the access point AP1 starts sending data (Step S13) as well. However, the access point AP1 can send the next data transmissions continuously during the predetermined duration "TXOP Limit" (Step S15 and S17), upon receiving the corresponding ACK packets from the access point AP2 (Step S14, S16 and S18).

According to the approach shown in FIG. 5, the amount of data to be transmitted per unit time (Packet Transmission Rate) is increased and efficient data transmission is possible, because the waiting period for Backoff is not required, compared to the approach shown in FIG. 4.

[Non-Patent Reference 1] ANSI/IEEE std 802.11, Wireless LAN medium access control (MAC) and physical layer (PHY) specifications, 1999

[Non-Patent Reference 2] IEEE P802.11e/D9.0, August 2004

[Non-Patent Reference 3] Fusao Nuno, Ichihiko Toyoda, and Masahiro Umehira, "Performance evaluation of QoS Control Scheme that uses back pressure traffic control," PIMRC2004, Vol. 2, pp. 830-834

DESCRIPTION OF THE INVENTION

Problem(s) to be Solved by the Invention

The conventional wireless ad-hoc network system based on the above-mentioned protocol has the following problems.

First, each of the access points AP1-AP4 in FIG. 1 acquires a transmission opportunity with an equal probability. In this case, the access points AP2 and AP3 act as relay nodes to relay data for the other access points. Therefore, the access points AP2 and AP3 have a larger amount of data and acquire fewer transmission opportunities compared to the access points AP1 and AP4 located at the left/right ends. As a result, data may overflow from a transmission buffer (a relay buffer) for storing data to be transmitted, retransmission for the overflowed data may be required, and throughput within the whole wireless ad-hoc network system may be degraded.

In addition, when applied to the TXOP shown in FIG. 5, the above-mentioned buffer overlow becomes significant; nevertheless the TXOP aims to improve throughput within the system. Because each of the access points AP1-AP4 transmits a larger amount of data, the data stored in the relay node becomes larger.

With reference to FIG. 6 and FIG. 7, the problem with regard to buffer overflow is described below.

In FIG. 6, access points AP1-AP3 send data to an access point AP4, and the access point AP4 sends data to access points AP5-AP7. The access point AP4 acts as a relay node within the wireless ad-hoc network. When applied to the wireless LAN standard in accordance with the above-mentioned Non-Patent Reference 1, each of the access points AP1-AP4 acquires the transmission opportunity equally. Then, the amount of data to be transmitted from the access point AP4 to the access points AP5-AP7 will be approximately one third of the total amount of data to be transmitted from the access points AP1-AP3 to the access pioint AP4. Therefore, data packets tend to remain at the transmission buffer in the access point AP4 as a relay node, and buffer overflow occurs when the data packets reach the limit of the buffer.

In FIG. 7, an access point AP1 sends data to an access point AP4 via access points AP2 and AP3, and at the same time the access point AP4 sends data to the access point AP1 via the access points AP3 and AP2. Within this network, the access points for sending data (AP1 and AP4) send data to their neighbor access points (AP1 sends data to AP2, and AP4 sends data to AP3). However, the access points as relay nodes (AP2 and AP3) need to relay data to plural of their neighbor access points (AP2 sends data to AP1 and AP3, and AP3 sends data to AP2 and AP4). Therefore, the access points as relay nodes (AP2 and AP3) need to acquire more transmission opportunities than the access points for sending data (AP1 and AP4); otherwise, data packets remain at the transmission buffer and accordingly buffer overflow occurs.

When buffer overflow occurs within the wireless ad-hoc network, the relay node will discard the data packets communicated via plural relay nodes using wireless resources. Discarding data packets due to buffer overflow wastes the wireless resources. Therefore, buffer overflow in the relay node may cause a serious problem within the wireless ad-hoc network.

In this regard, the current wireless LAN standards (such as Non-Patent Reference 1) do not define the technologies to solve the problem of buffer overflow in the relay node. Therefore, the performance in the relay node will be degraded significantly due to buffer overflow, when those standards are applied to the wireless ad-hoc network.

Non-Patent Reference 3 describes the technology to avoid data packets remaining at the buffer. According to the Non-Patent Reference 3, a field comprising 1 bit is added to the ACK packet transmitted from the relay node. When buffer overflow is likely to occur, the command to decrease the rate is transmitted to the sending node. This technology uses only 1 bit to control traffic for the sending node, and does not take into consideration the amount of data to be transmitted (Packet Transmission Rate) and the amount of data packets at the transmission buffer.

In view of the above-mentioned problems, it is a general object of the present invention to provide a wireless communication device, a wireless communication system and a wireless communication method for preventing buffer overflow due to data packets remaining in a relay node within a wireless ad-hoc network system, and for improving throughput within the whole system.

SUMMARY OF THE INVENTION

Means for Solving the Problem

The above-mentioned object is achieved by a wireless communication device within a wireless ad-hoc network system, comprising:

an information acquisition unit configured to acquire information on the amount of data relay processing in the wireless communication device and/or a neighbor wireless communication device;

a priority calculation unit configured to calculate a transmission priority of the wireless communication device, based on the acquired information; and a priority determination unit configured to determine a priority related parameter for data transmission from the wireless communication device, based on the transmission priority.

The above-mentioned object is also achieved by a wireless ad-hoc network system in which one of a plurality of wireless communication devices communicates data with a neighbor wireless communication device, and relays the data from a source wireless communication device to a destination wireless communication device, wherein the one of the wireless communication devices comprises:

an information acquisition unit configured to acquire information on the amount of data relay processing in the neighbor wireless communication device;

a setting unit configured to set transmission probability of both the one wireless communication divice and the neighbor wireless communication device below a predetermined value, based on the acquired information.

In addition, the above-mentioned object is also achieved by a wireless communication method within a wireless ad-hoc network system, comprising the steps of:

acquiring information on the amount of data relay processing in a wireless communication device and/or a neighbor wireless communication device;

calculating a transmission priority of the wireless communication device, based on the acquired information; and determining a priority related parameter for data transmission from the wireless communication device, based on the transmission priority.

Effect of the Invention

According to the embodiments of the present invention, it is possible to prevent buffer overflow due to data packets remaining in a relay node, to improve throughput within the whole system, and to improve performance within the whole wireless ad-hoc network system.

BRIEF DESCRIPTION OF THE DRAWINGS

Other objects, features and advantages of the present invention will become more apparent from the following detailed description when read in conjunction with the accompanying drawings, in which:

FIG. 21 shows another example of the amount of transmission traffic monitored by each access point;

DESCRIPTION OF THE PREFERRED EMBODIMENTS

In the following, embodiments of the present invention are described according to the IEEE 802.11 wireless LAN protocol (Non-Patent Reference 1).

First Embodiment

Figure 1:
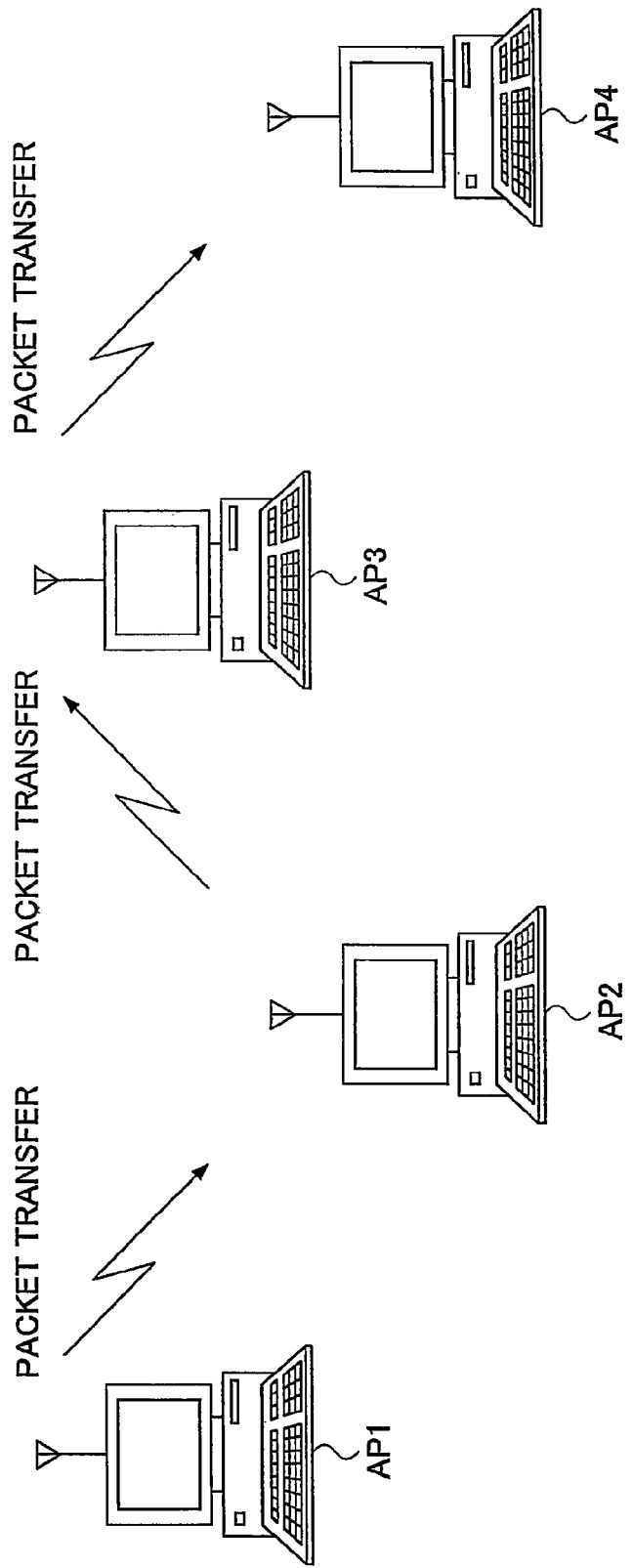
FIG. 1 shows an example of a wireless ad-hoc network system.
Figure 2:
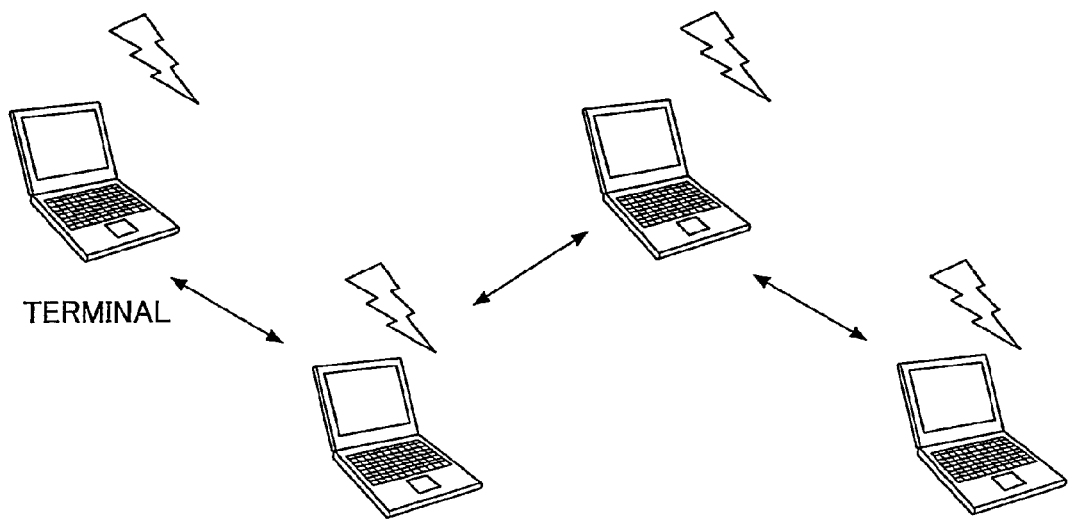
FIG. 2 shows an example of an ad-hoc based network.
Figure 3:
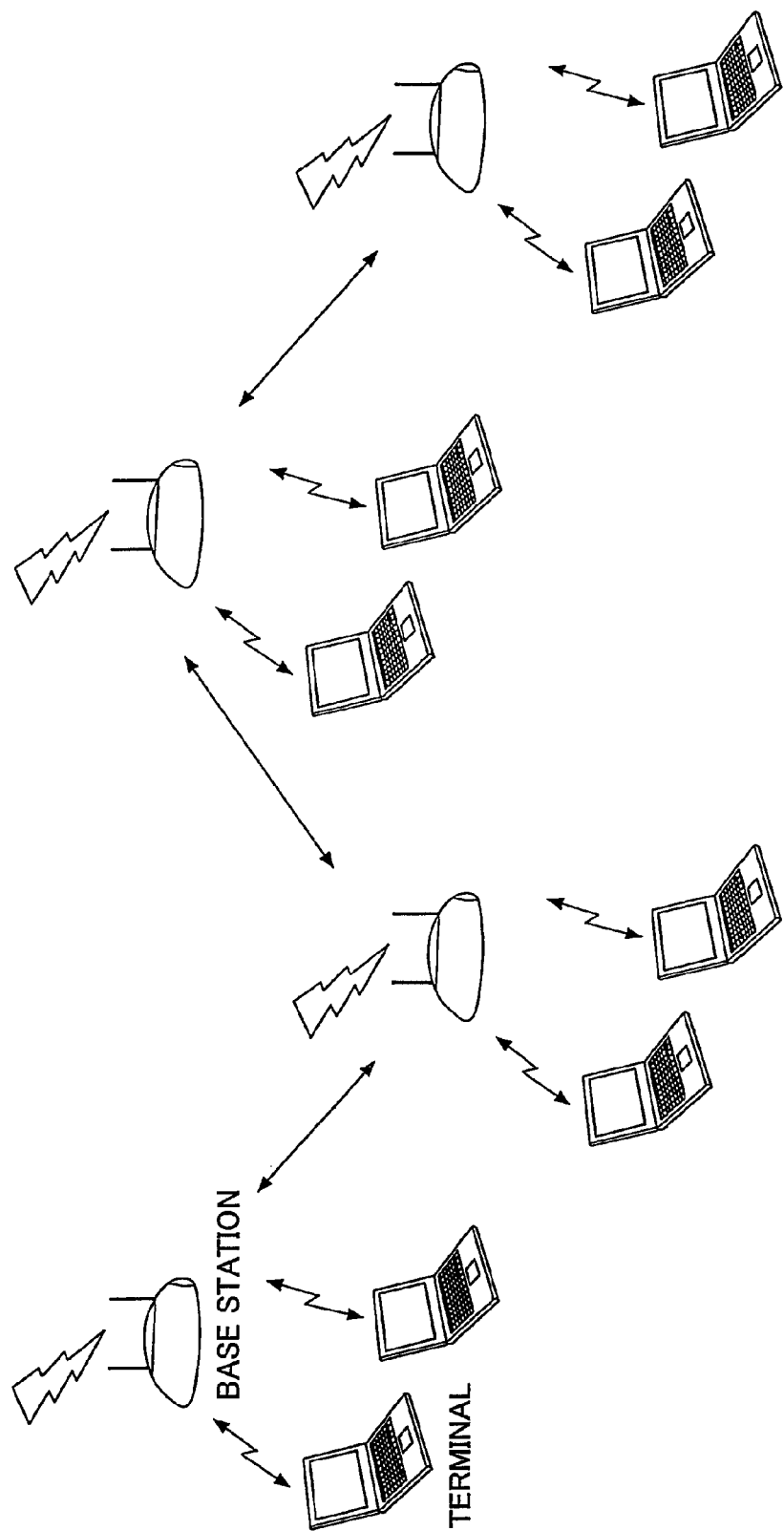
FIG. 3 shows an example of a mesh based network.
Figure 4:
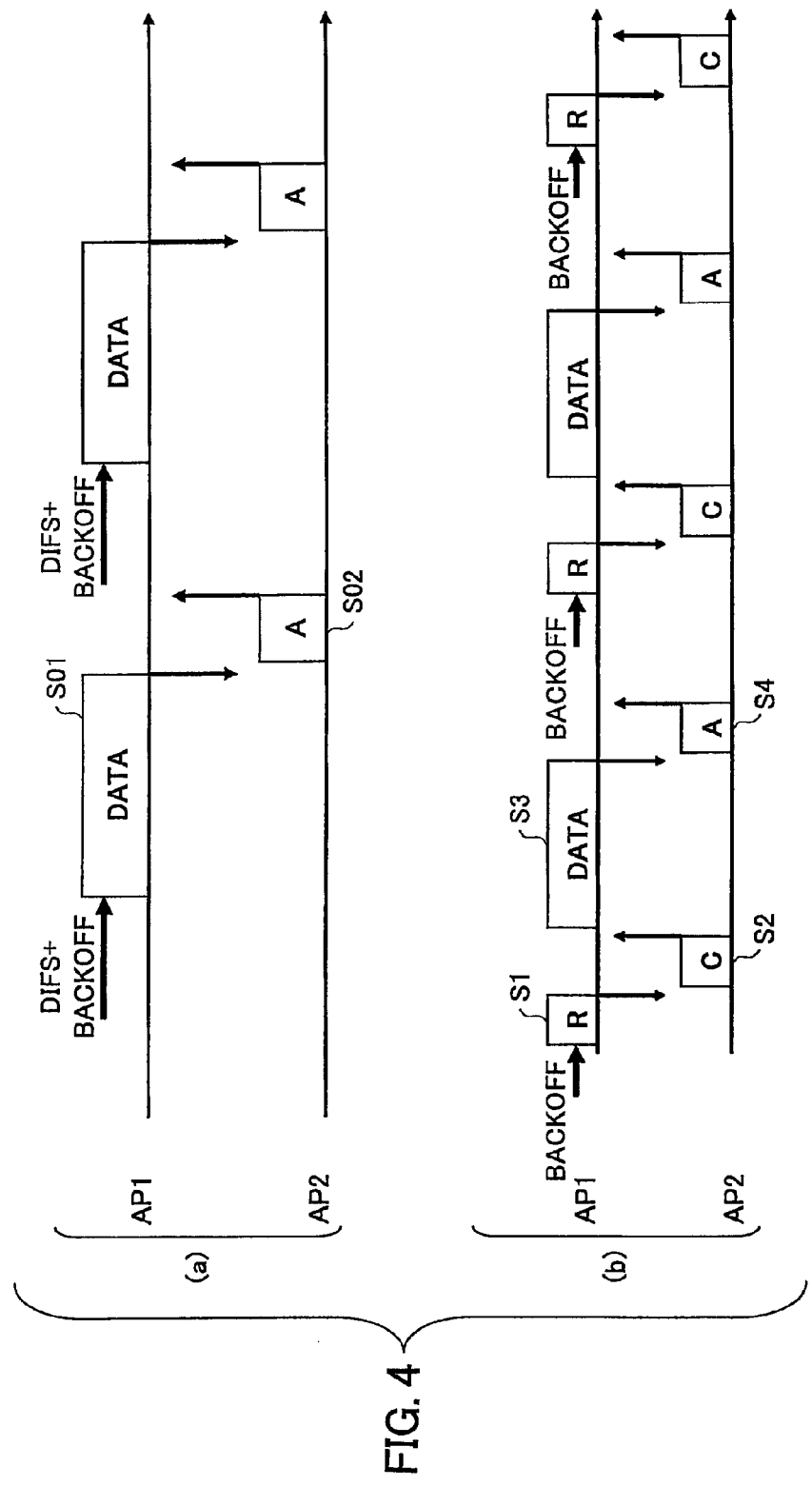
FIG. 4 shows examples of data transmission in accordance with IEEE 802.11.
Figure 5:
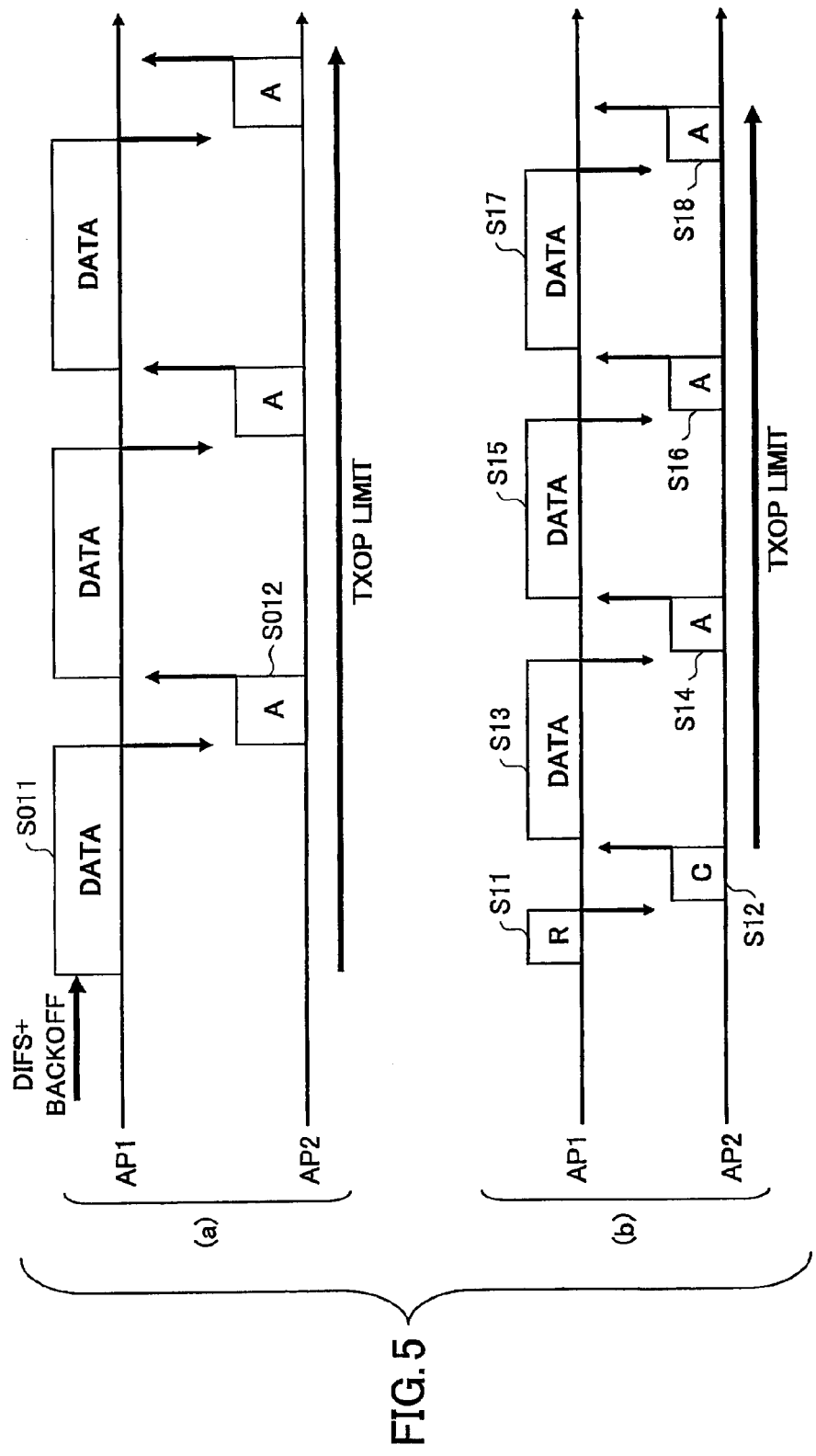
FIG. 5 shows examples of data transmission in accordance with IEEE 802.11e.
Figure 6:
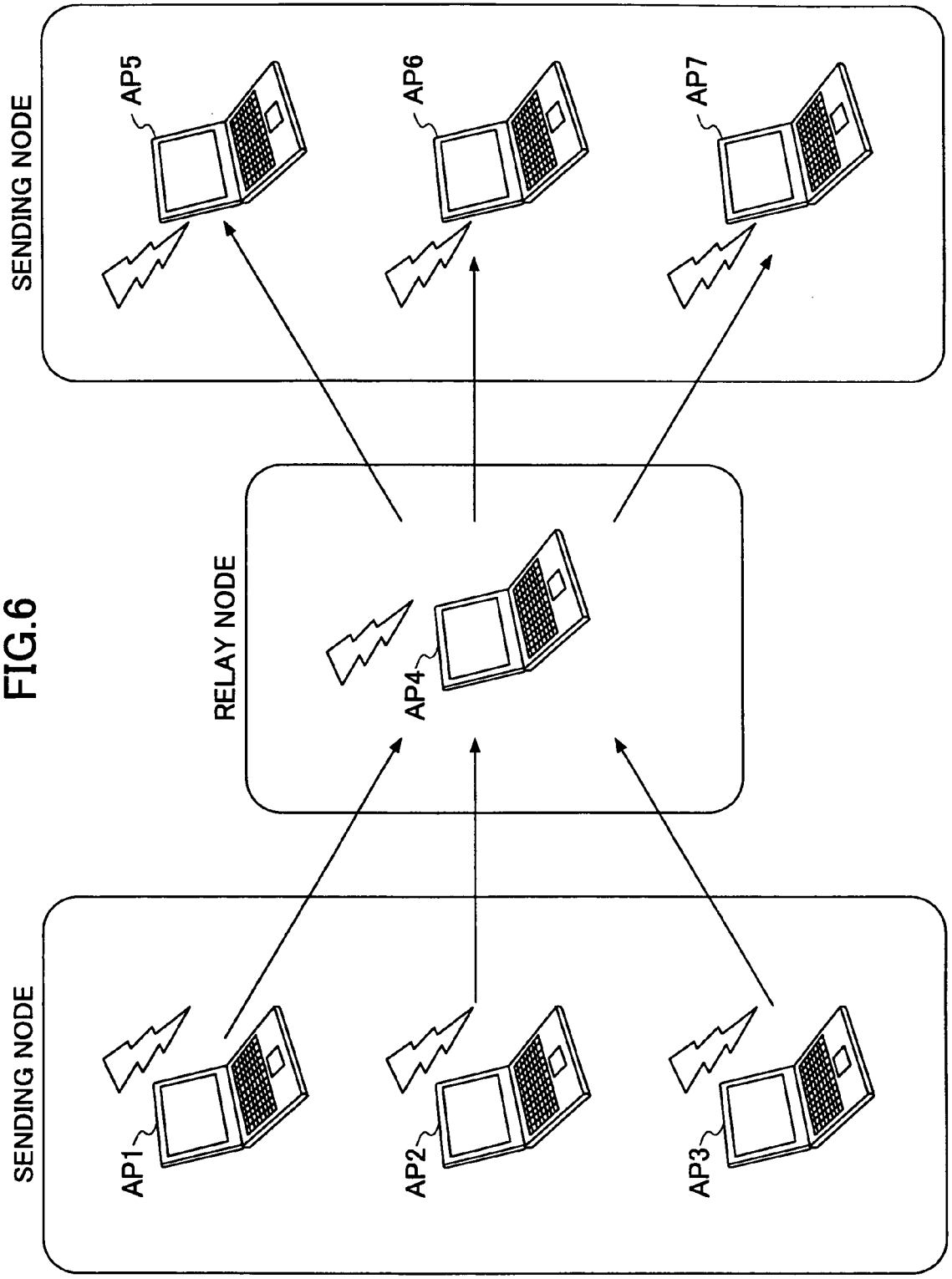
FIG. 6 shows a first problem with regard to buffer overflow.
Figure 7:
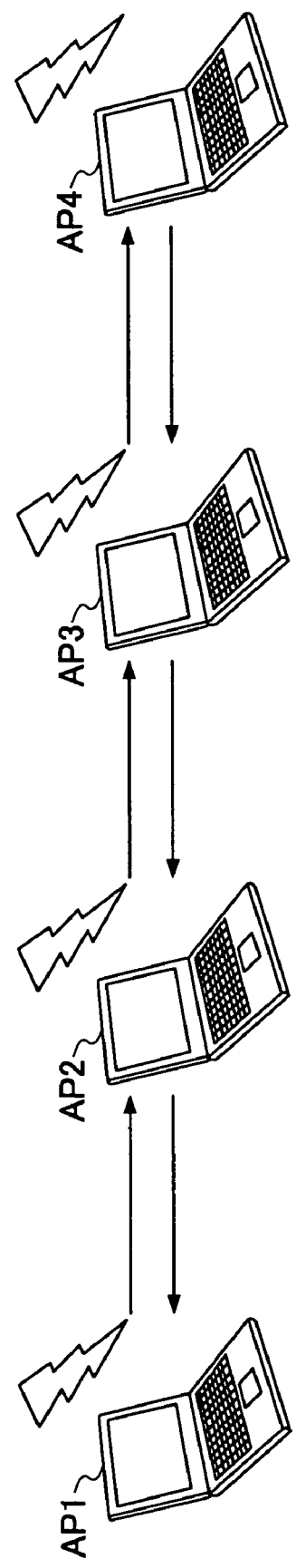
FIG. 7 shows a second problem with regard to buffer overflow.
Figure 8:
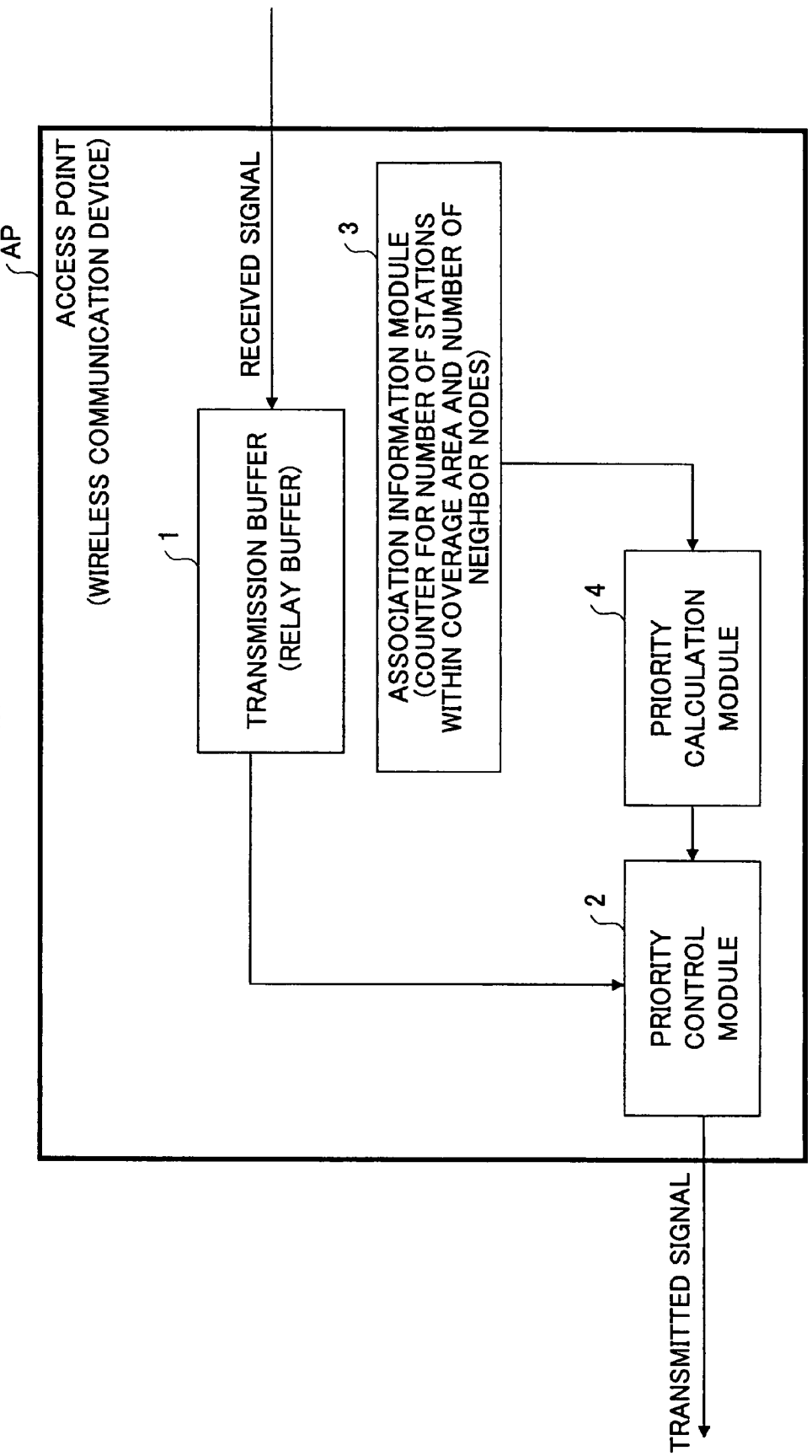
FIG. 8 shows a wireless communication device according to a first embodiment of the present invention.

FIG. 8 shows a wireless communication device according to a first embodiment of the present invention.

In FIG. 8, the wireless communication device acting as an access point AP includes the following data transmission (data relay) functions: a transmission buffer 1 for temporarily storing data to be transmitted (received signals); a priority control module 2 for transmitting data based on a transmission priority calculated from a priority related parameter (explained below); an association information module 3 for counting the number of stations (STAs) within a coverage area of its own access point AP and the number of neighbor nodes in direct association with its own access point AP, and for acquiring information on the amount of data relay processing; a priority calculation module 4 for calculating the transmission priority of its own access point AP based on the information from the association information module 3, and for determining the priority related parameter of the priority control module 2.

Figure 9:
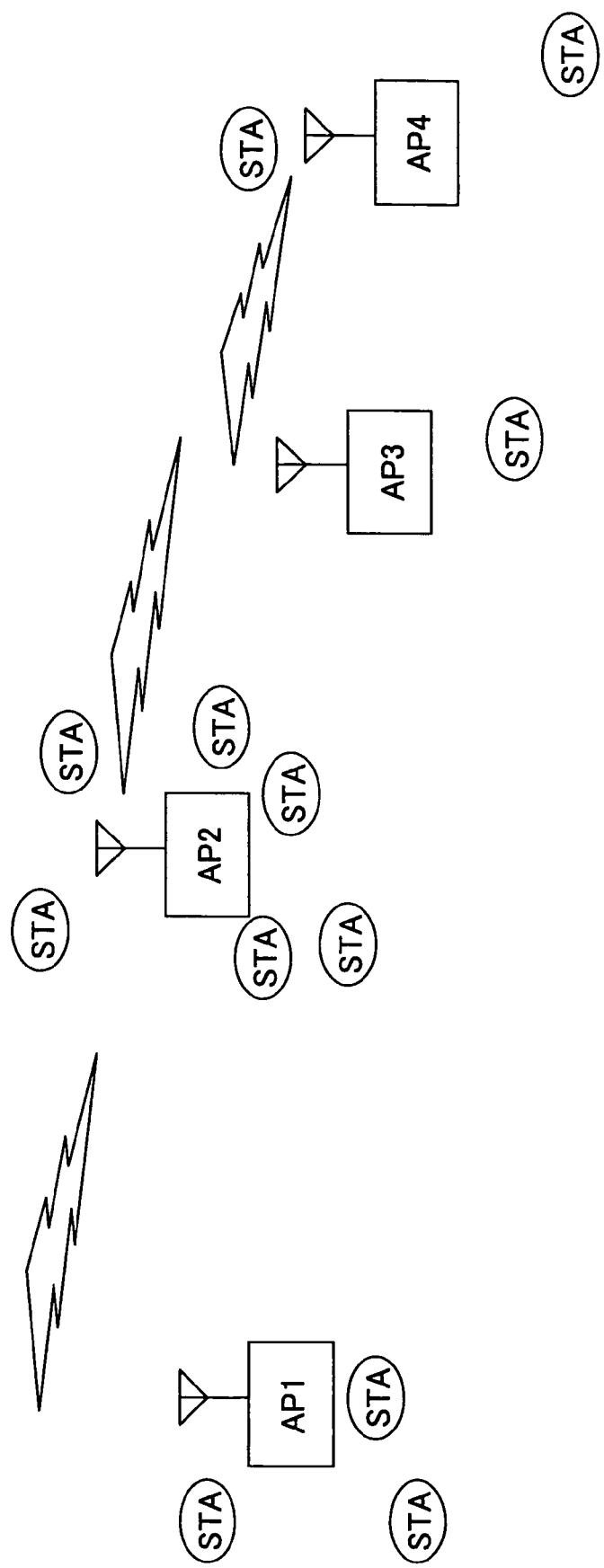
FIG. 9 shows an example of stations within a coverage area of each access point.

FIG. 9 shows an example of stations within a coverage area of each access point. Within the coverage areas, an access point AP1 has three stations (STAs), an access point AP2 has six stations, an access point AP3 has one station, and an access point AP2 has two stations. The association information module 3 (FIG. 8) in each of the access points AP1-AP4 counts the number of stations within the coverage area of its own access point. Based on the number of stations within the coverage area, the priority calculation module 4 calculates the transmission priority. More specifically, if the number of stations within the coverage area increases, the amount of data relay processing is expected to be increased. In this case, the priority calculation module 4 sets a higher priority, in order to prevent buffer overflow.

Figure 10:
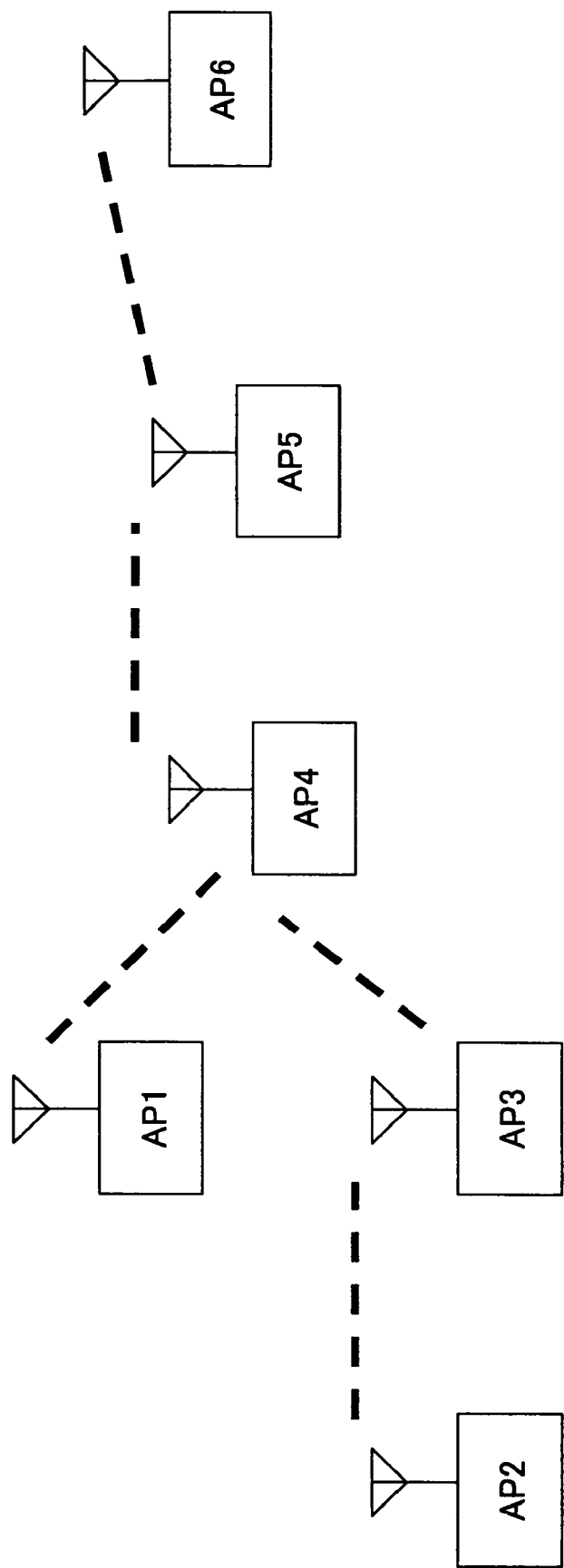
FIG. 10 shows an example of association relationships among access points.

FIG. 10 shows an example of association relationships among access points. An access point AP1 has one neighbor node (associated with AP4), an access point AP2 has one neighbor node (associated with AP3), access point AP3 has two neighbor nodes (associated with AP2 and AP4), access point AP4 has three neighbor nodes (associated with AP1, AP3 and AP5), access point AP5 has two neighbor access points (associated with AP4 and AP6), and access point AP6 has one neighbor access point (associated with AP5). The association information module 3 (FIG. 8) in each of the access points AP1-AP4 counts the number of its neighbor nodes. Based on the number of its neighbor nodes, the priority calculation module 4 calculates the transmission priority. More specifically, if the number of neighbor nodes increases, the amount of data relay processing is expected to be increased. In this case, the priority calculation module 4 sets a higher priority, in order to prevent buffer overflow.

Controlling the amount of data to be transmitted based on the transmission priority calculated by the priority control module 2 can be achieved by changing an EDCA (Enhanced Distributed Channel Access) parameter defined in IEEE 802.11e. Conventionally, the EDCA is a mechanism for QoS. In this embodiment, the EDCA is used to control transmission traffic.

Figure 11:
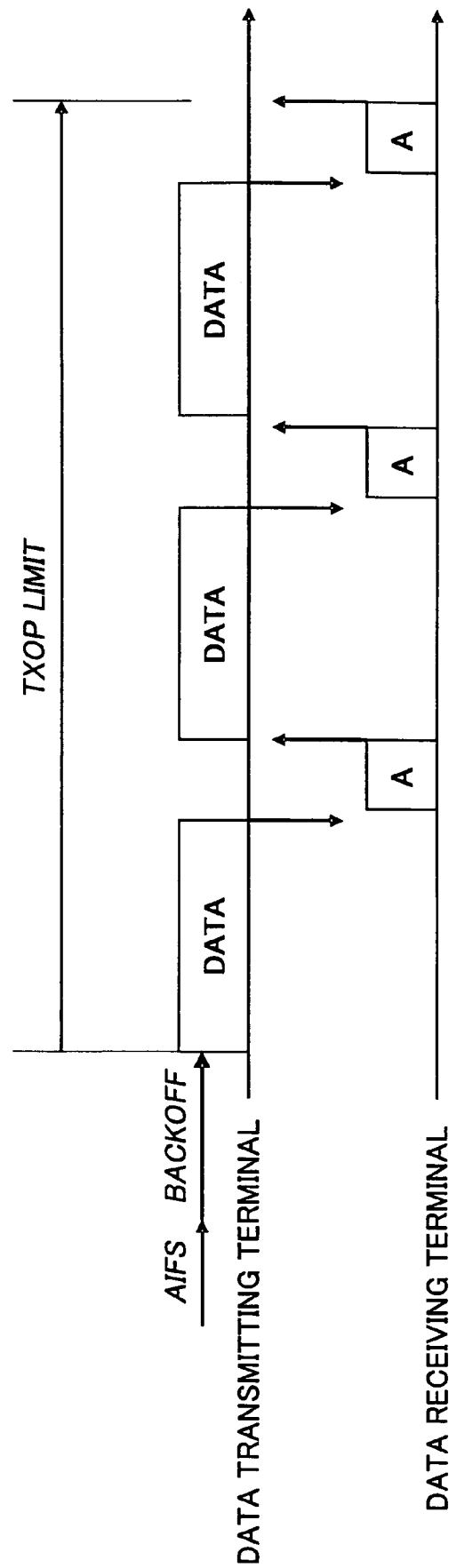
FIG. 11 shows an EDCA parameter.

FIG. 11 shows an EDCA parameter. The EDCA parameter for determining the EDCA operation includes AIFS (Arbitrary Inter Frame Space), Backoff and TXOP Limit (Transmission Opportunity Limit). AIFS defines a predetermined period necessary to wait before Backoff, Backoff defines a random time necessary to wait before transmitting the packet, and TXOP Limit defines the duration for which one node can transmit data packets continuously.

AIFS is a fixed period which can be derived from the following equation:

$$AIFS = AIFSN * SlotTime,$$

where AIFSN (Arbitrary Inter Frame Space Number) is a fixed value determined from the priority of QoS, and SlotTime is a slot time determined by the physical layer protocol. According to IEEE 802.11, the default value for AIFSN is 2, and default value for SlotTime is 20 μs.

Backoff is a random time which can be derived from the following equation:

Backoff=random( )*SlotTime, where random( ) is a random value selected from a closed interval [0, CW]. CW (Contention Window) is a fixed value determined from the physical layer, the number of times to be retransmitted, the priority of QoS, etc. Particularly, the CW value before retransmission is called CWmin. For example, the default value for CWmin is 31 according to IEEE 802.11. In this case, using 20 μs of SlotTime, the average Backoff is derived to be 310 μs.

TXOP Limit is a fixed value determined from the priority of QoS only. Without QoS, TXOP Limit is not defined and only one packet can be transmitted (plural packets cannot be transmitted continuously).

Therefore, by making the AIFSN parameter smaller, the waiting period before transmitting data will be shorter, and then the transmission priority will be higher. In addition, by making the CW parameter smaller, the Backoff time will be shorter, and then the transmission priority will be higher. Moreover, by making the TXOP Limit parameter longer, the access point can occupy the bandwidth over a longer time period, and then the transmission priority will be higher.

Figure 12:
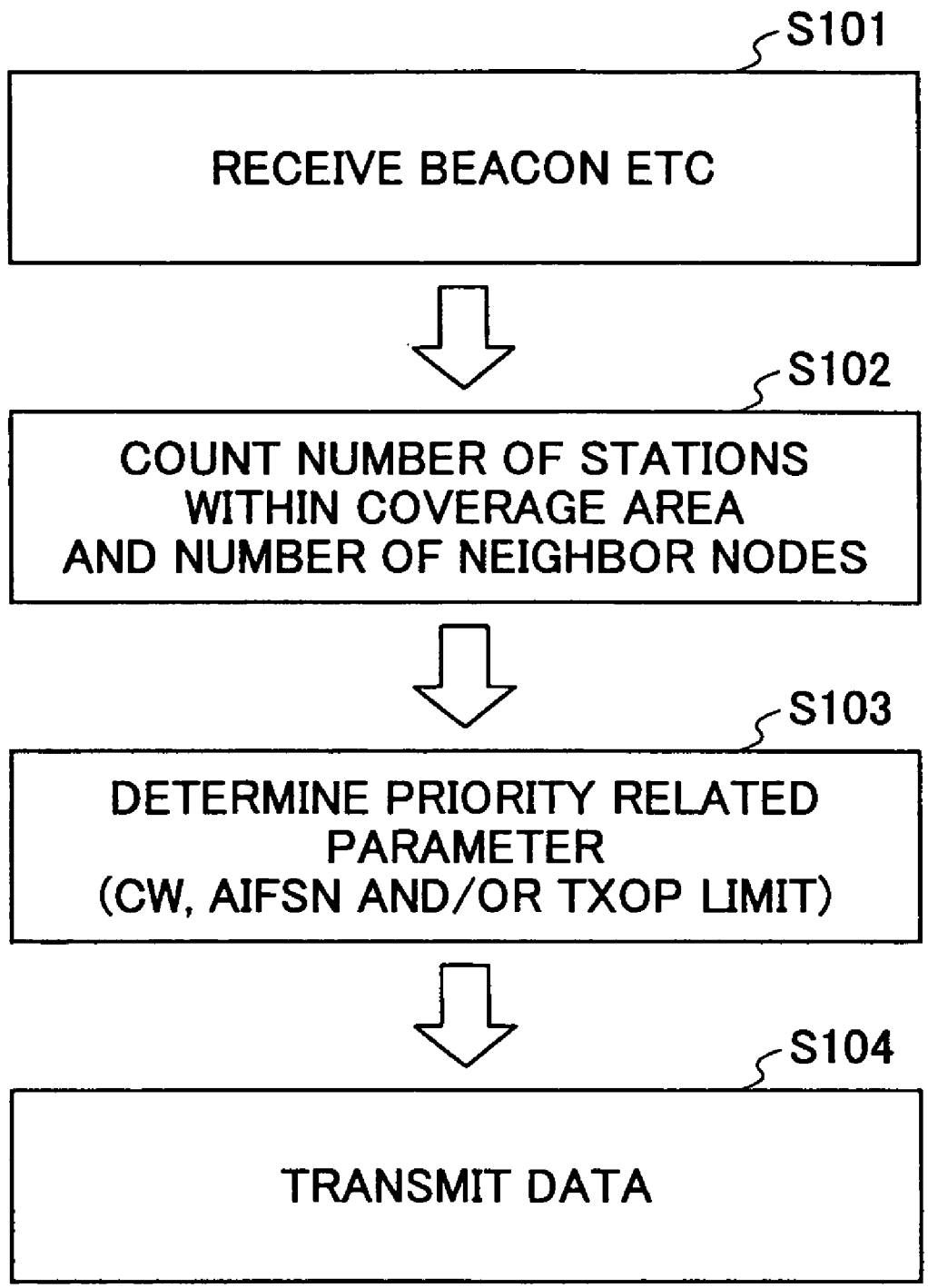
FIG. 12 is a flowchart which illustrates data transmission processing in the first embodiment of the invention.

FIG. 12 is a flowchart which illustrates data transmission processing in the first embodiment shown in FIG. 8.

In FIG. 12, each access point AP within the wireless ad-hoc network system receives a beacon and the like from the other access points under the control of the association information module 3 (Step S101), and counts the number of stations within the coverage area of the access point AP and the number of neighbor nodes associated with the access point AP (Step S102).

Next, the priority calculation module 4 calculates the transmission priority based on the number of stations and the number of the access points acquired by the association information module 3, and determines the priority related parameter (CW, AIFSN and/or TXOP Limit) (Step S103).

Then, the priority control module 2 transmits data held at the transmission buffer 1, based on the priority related parameter (Step S104).

Second Embodiment

Figure 13:
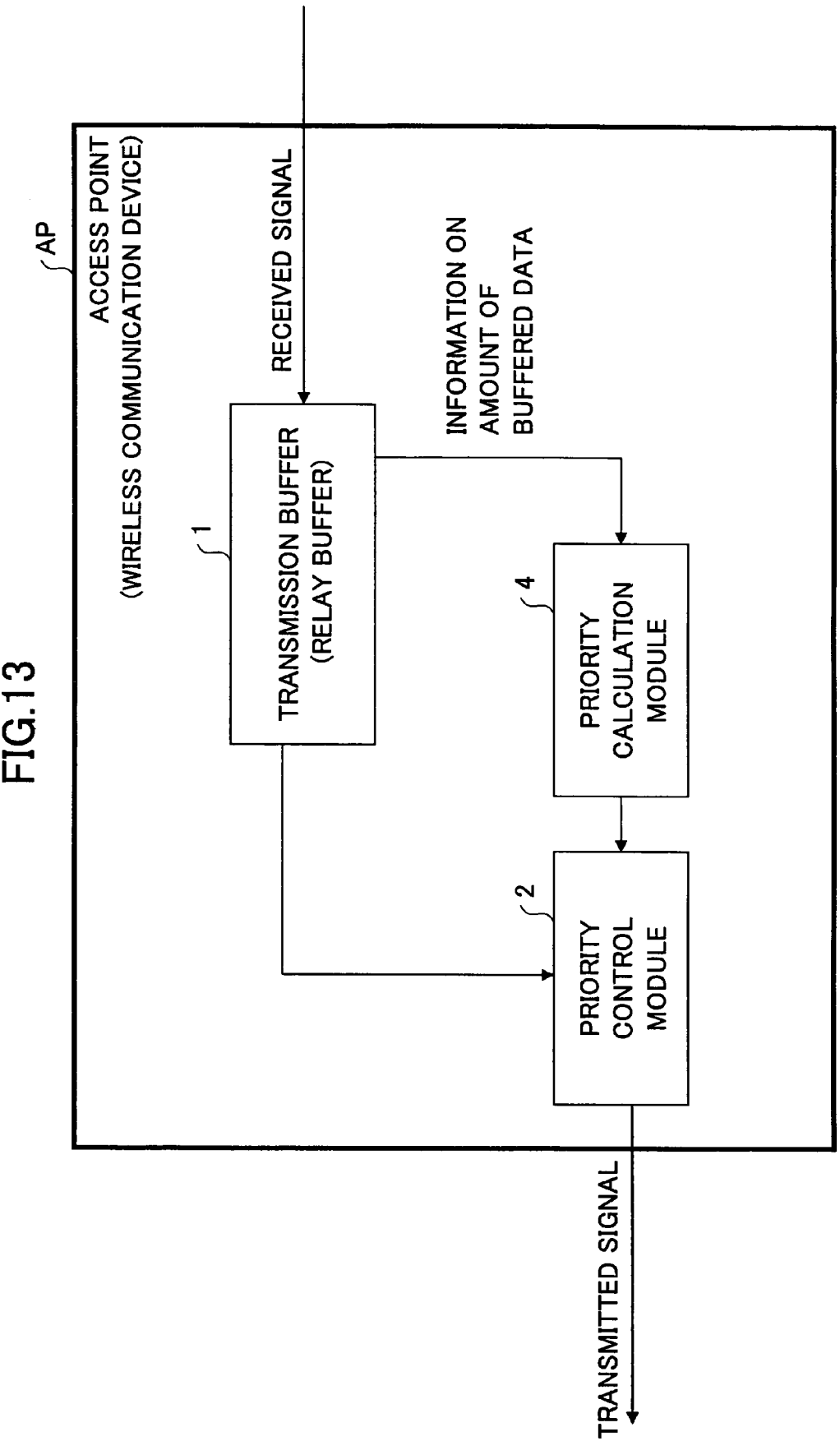
FIG. 13 shows a wireless communication device according to a second embodiment of the present invention.

FIG. 13 shows a wireless communication device according to a second embodiment of the present invention. The priority calculation module 4 acquires information on the amount of buffered data indicating the amount of data relay processing from a transmission buffer 1. Then, the priority calculation module 4 calculates the transmission priority of its own access point AP based on the information on the amount of buffered data, and determines the priority related parameter of the priority control module 2. The other components operate similarly to the components shown in FIG. 8. It is noted that the wireless communication device in FIG. 13 may include the association information module 3 in FIG. 8, and use the number of stations, the number of neighbor nodes and the amount of buffered data to determine the priority related parameter in the priority calculation module 4.

Figure 14:
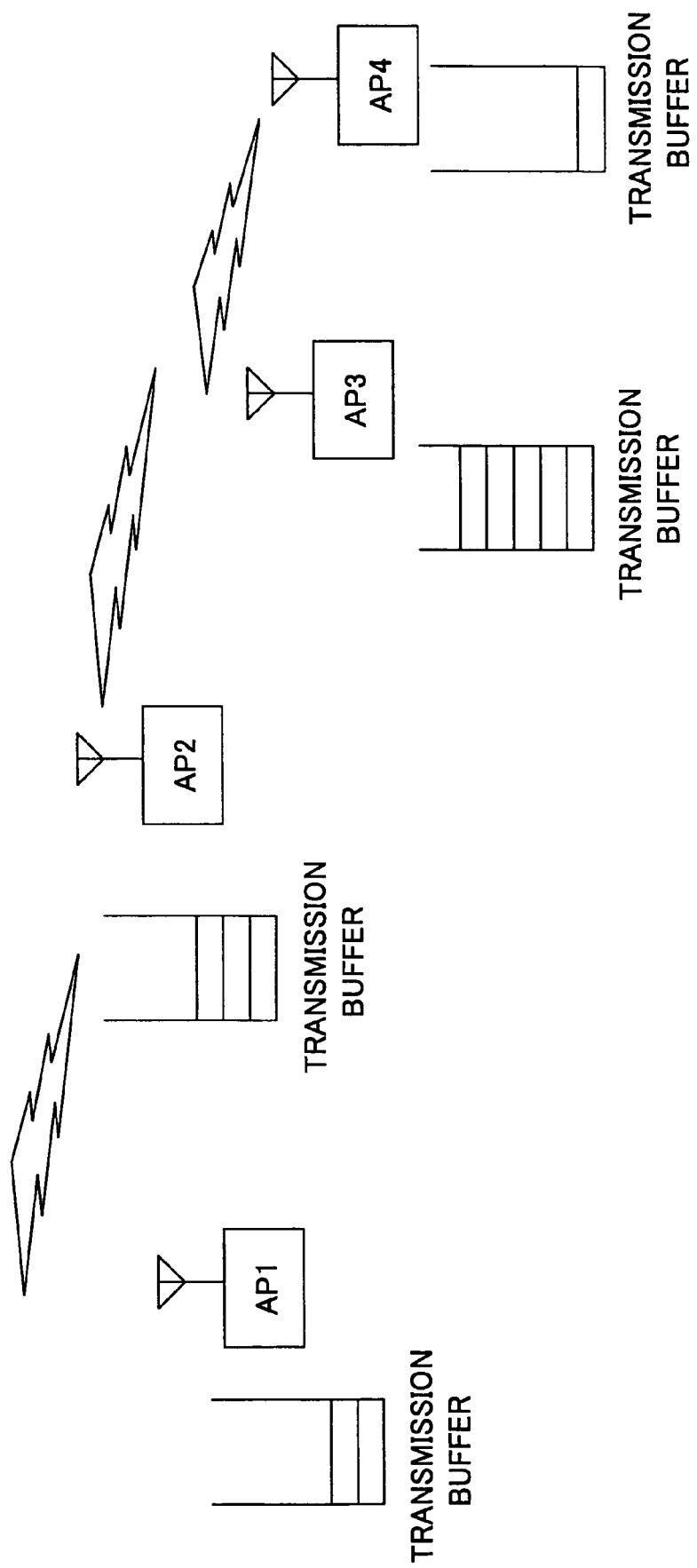
FIG. 14 shows an example of the amount of data at the transmission buffer in each access point.

FIG. 14 shows an example of the amount of data at the transmission buffer in each access point. The amount of buffered data in an access point A3 is largest, that in an access point A2 is the second largest, that in an access point A1 is the third largest, and that in an access point A4 is the smallest. Each of the access points AP1-AP4 monitors its own transmission buffer 1 (FIG. 13), and the priority calculation module 4 calculates the transmission priority based on the amount of buffered data. More specifically, if the amount of buffered data increases, the amount of data relay processing is expected to be increased. In this case, the priority calculation module 4 sets a higher priority, in order to prevent buffer overflow.

Figure 15:
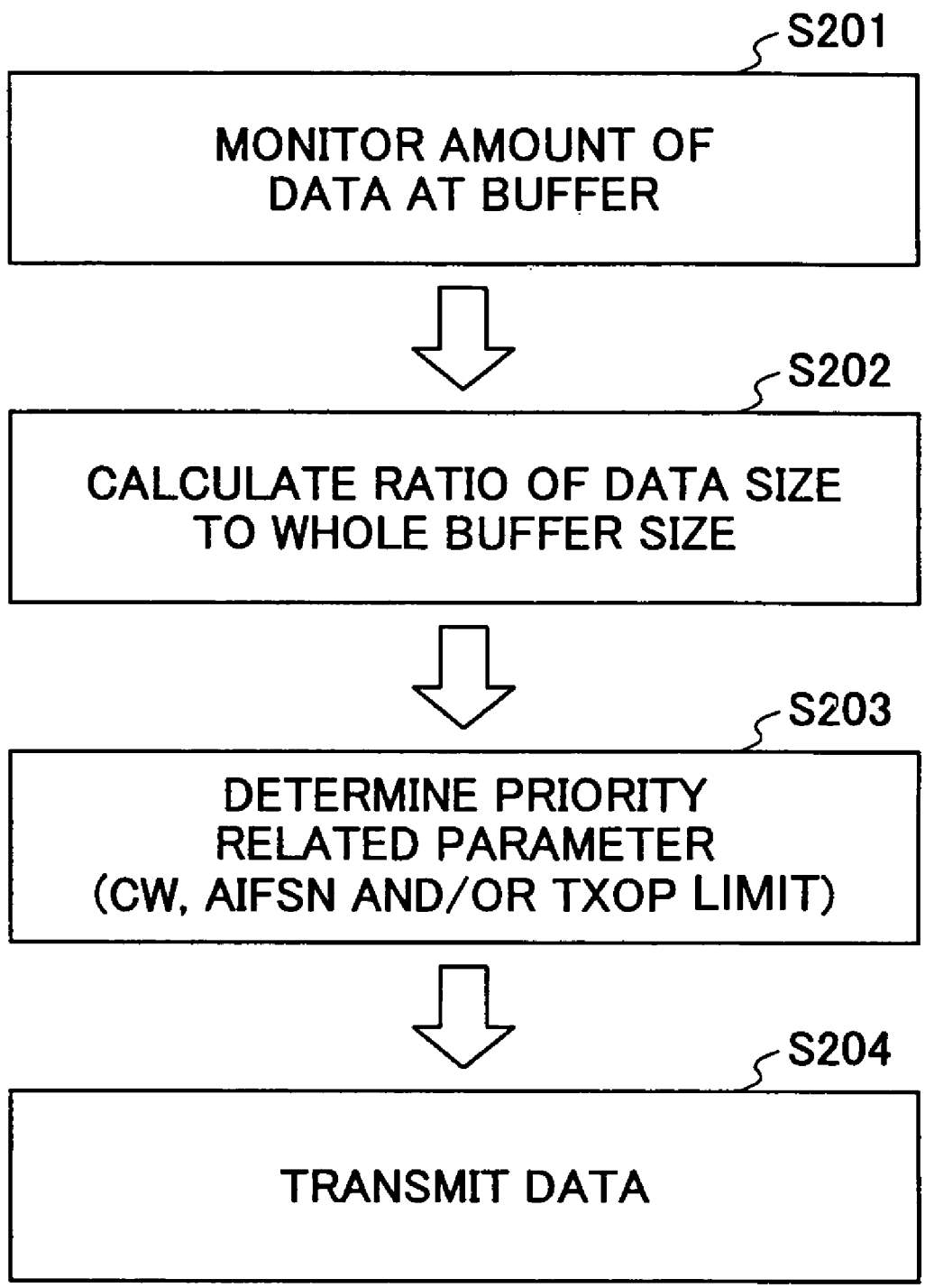
FIG. 15 is a flowchart which illustrates data transmission processing in the first embodiment of the invention.

FIG. 15 is a flowchart which illustrates data transmission processing in the second embodiment shown in FIG. 13.

In FIG. 15, using the priority calculation module 4, each access point AP within the wireless ad-hoc network system monitors the amount of data at the transmission buffer (Step S201), and calculates the ratio of the data size to the whole buffer size (Step S202).

Next, the priority calculation module 4 calculates the transmission priority based on the ratio of the data size to the whole buffer size, and determines the priority related parameter (CW, AIFSN and/or TXOP Limit) (Step S203).

Then the priority control module 2 transmits data held at the transmission buffer 1, based on the priority related parameter (Step S204).

Third Embodiment

Figure 16:
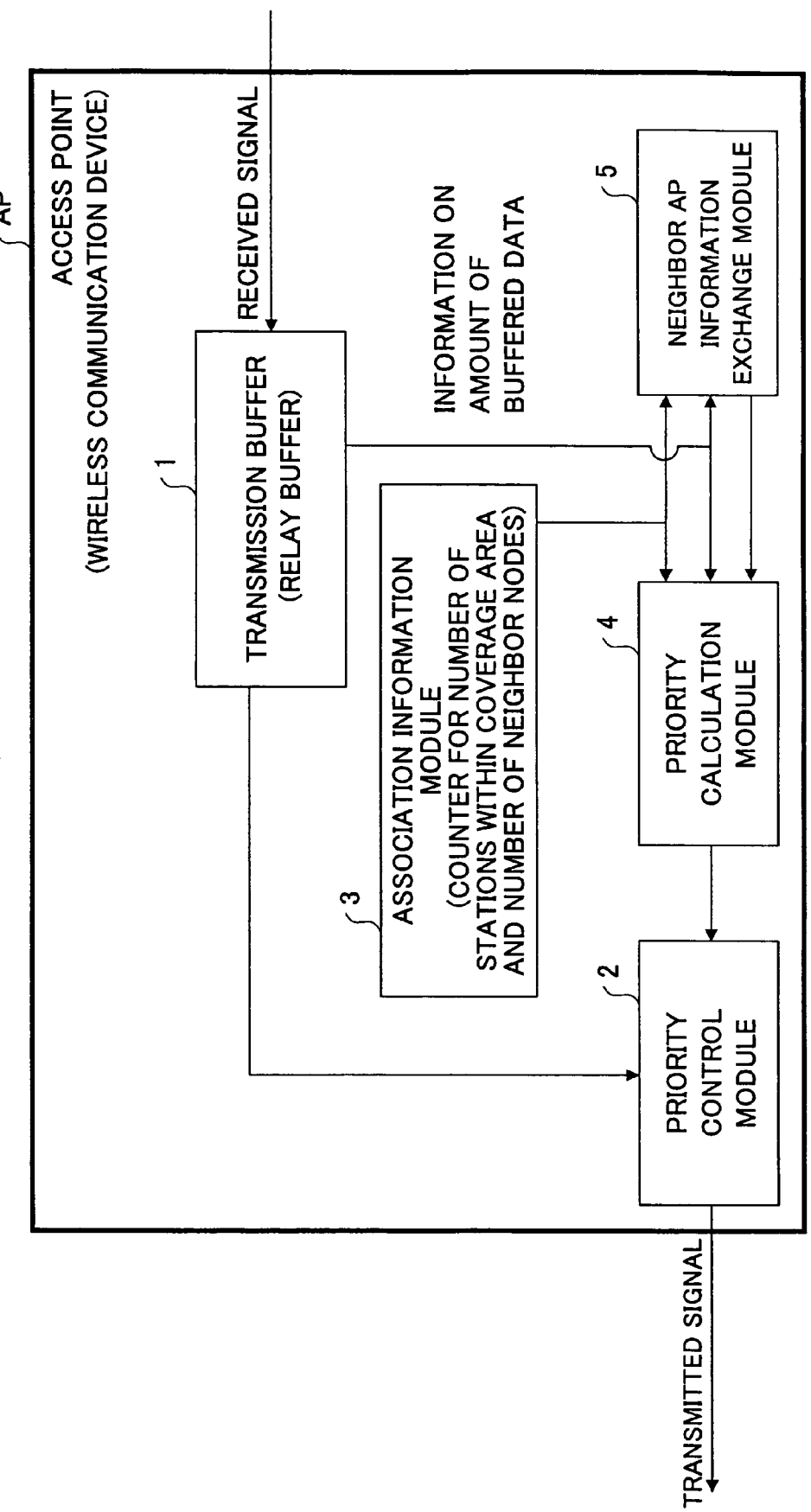
FIG. 16 shows a wireless communication device according to a third embodiment of the present invention.

FIG. 16 shows a wireless communication device according to a third embodiment of the present invention. A neighbor AP information exchange module 5 exchanges the number of stations within the coverage area, the number of neighbor nodes, and the amount of buffered data in its own access point with a neighbor access point. The priority calculation module 4 determines the priority related parameter, considering the number of stations within the coverage area, the number of neighbor nodes, and the amount of bufferd data in both its own access point and the neighbor access point. In this case, the wireless communication device can determine the transmission priority relative to the other wireless communication devices, and it is possible to adapt the transmission priority to the network conditions.

Figure 17:
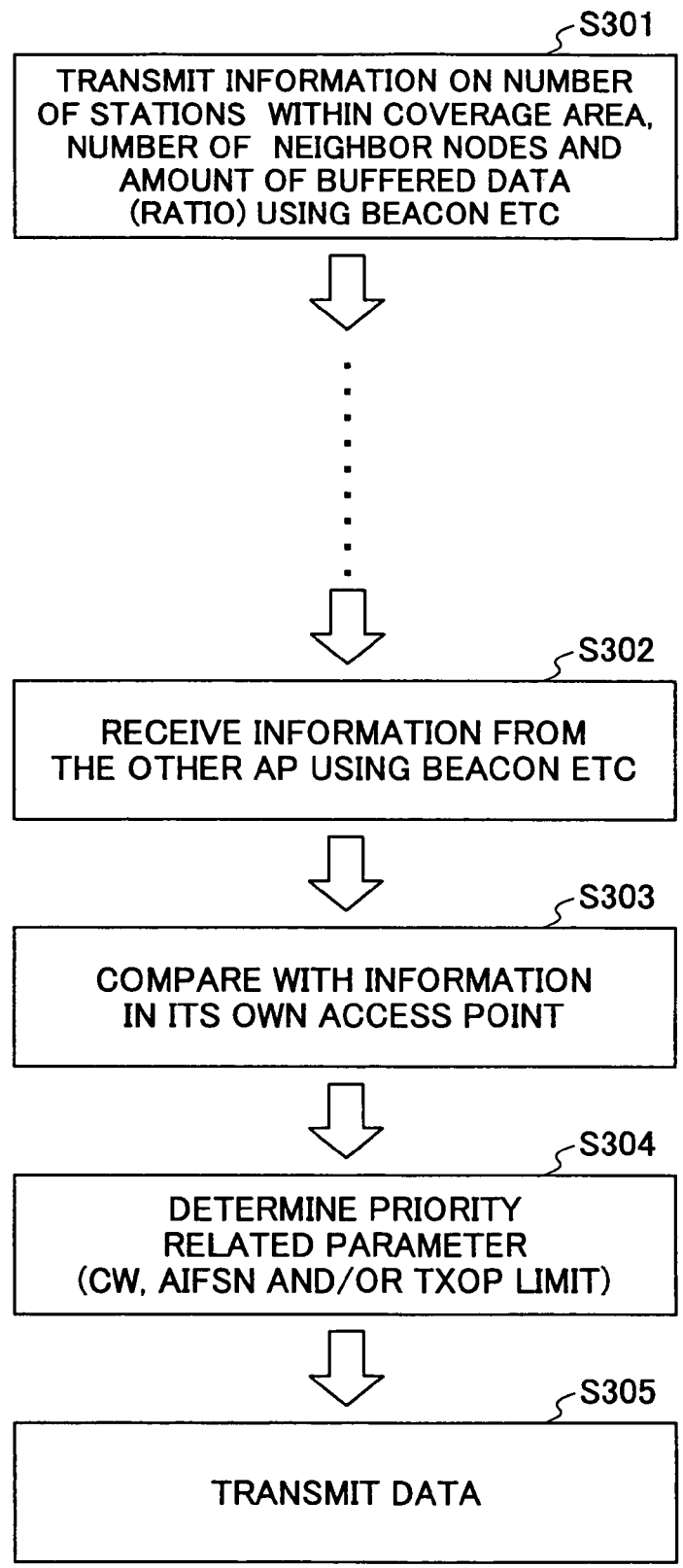
FIG. 17 is a flowchart which illustrates data transmission processing in the third embodiment of the invention.

FIG. 17 is a flowchart which illustrates data transmission processing in the third embodiment shown in FIG. 16.

In FIG. 17, using the neighbor AP information exchange module 5, each access point AP within the wireless ad-hoc network system transmits the number of stations within the coverage area, the number of its neighbor nodes, and the amount of buffered data (the ratio) acquired by the association information module 3 to the neighbor access point using a beacon and the like (Step S301).

At the same time, the neighbor AP information exchange module 5 receives the number of stations within the coverage area, the number of neighbor nodes, and the amount of buffered data in the neighbor access point (Step S302).

Next, the priority calculation module 4 compares the information acquired from the neighbor access point by the neighbor AP information exchange module 5 with the number of stations, the number of its neighbor nodes, and the amount of buffered data in its own access point acquired by the association information module 3 (Step S303). Based on this total comparison, the priority calculation module 4 calculates the transmission priority and determines the priority related parameter (CW, AIFSN and/or TXOP Limit) (Step S304).

Then the priority control module 2 transmits data held at the transmission buffer 1, based on the priority related parameter (Step S305).

Fourth Embodiment

Figure 18:
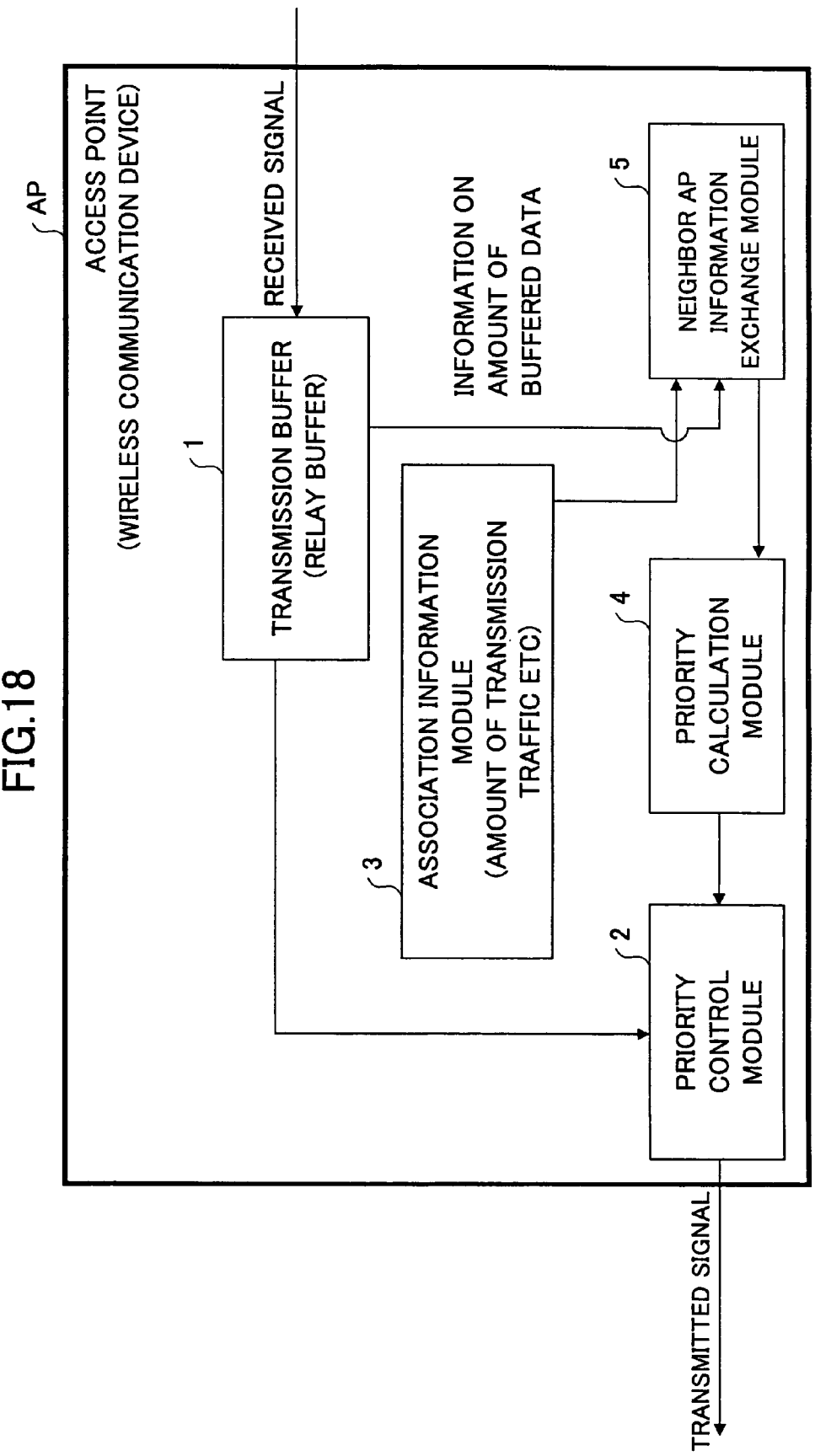
FIG. 18 shows a wireless communication device according to a fourth embodiment of the present invention.

FIG. 18 shows a wireless communication device according to a fourth embodiment of the present invention. The neighbor AP information exchange module 5 transmits information on the amount of transmission traffic and the like to the neighbor access point, for example using a signaling mechanism, as a control packet. At the same time, the neighbor AP information exchange module 5 recieves a control packet from the neighbor access point, and the priority calculation module 4 determines the priority related parameter.

Figure 19:
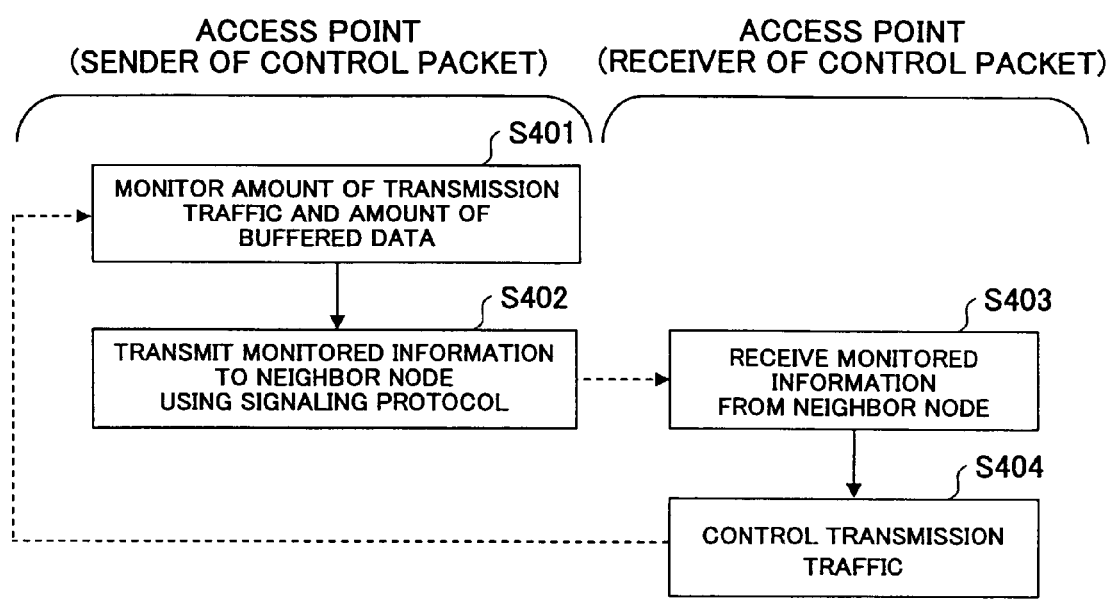
FIG. 19 is a flowchart which illustrates flow control in the fourth embodiment of the invention.

FIG. 19 is a flowchart which illustrates flow control in the fourth embodiment. The flowchart is classified into the following three steps.

(1) Monitoring the amount of transmission traffic and the amount of buffered data;

(2) Transmitting the monitored information to the neighbor node using a signaling mechanism and the like; and (3) Controlling the transmission traffic.

In FIG. 19, the access point which relays data packets constantly monitors the amount of transmission traffic and the number of packets at the transmission buffer (Step S401). Since the amount of transmission traffic and the number of packets at the transmission buffer can change at any time, the relay access point constantly monitors them. Then, the access point which relays data packets transmits the monitored information (the amount of transmission traffic and the number of packets at the transmission buffer) to the associated neighbor access point using a control packet (Step S402).

When the associated neighbor access point receives the control packet (Step S403), it controls transmission traffic by controlling the above-mentioned EDCA parameter based on the monitored information (the amount of transmission traffic and the number of packets at the transmission buffer in the relay node) included in the control packet.

In the following, each of the above steps is described in detail.

Figure 20:
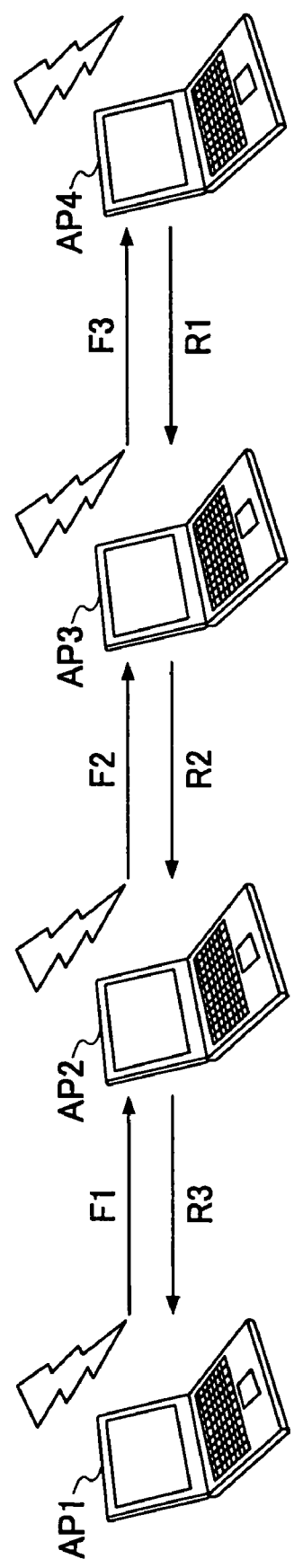
FIG. 20 shows an example of the amount of transmission traffic monitored by each access point.

FIG. 20 shows an example of the amount of transmission traffic monitored by each access point. Each of access points AP1-AP4 monitors its own transmission traffic. For example, the access point AP1 monitors its transmission traffic F1, the access point AP2 monitors its transmission traffic F2 and R3, the access point AP3 monitors its transmission traffic F3 and R2, and the access point AP4 monitors its transmission traffic R1.

FIG. 21 shows another example of the amount of transmission traffic monitored by each access point. An access point AP1 monitors its transmission traffic F1, an access point AP2 monitors its transmission traffic F2, an access point AP3 monitors its transmission traffic F3, and an access point AP4 monitors either transmission traffic F5, F6 and F7 respectively transmitted to access points AP5-AP7 or total transmission traffic F4 (F5+F6+F7).

It is noted that monitoring the amount of transmission traffic is achieved by monitoring the number of received ACK packets with respect to the data packets sent from the access point for a certain period of time. The access point may use a peak value of the amount of transmission traffic, instead of the amount of transmission traffic for a certain period of time. In addition to the total amount of transmission traffic, the access point may collect and transmit statistical traffic information for either each priority of QoS or each link for the purpose of accurate flow control. With regard to the period of monitoring, the access point may use the average or the running average for a predetermined period.

As a signaling mechanism for transmitting information to the neighbor access point, either of the following two options can be used.

(1) By means of unicast; and (2) By means of a beacon transmitted periodically.

Figure 22:
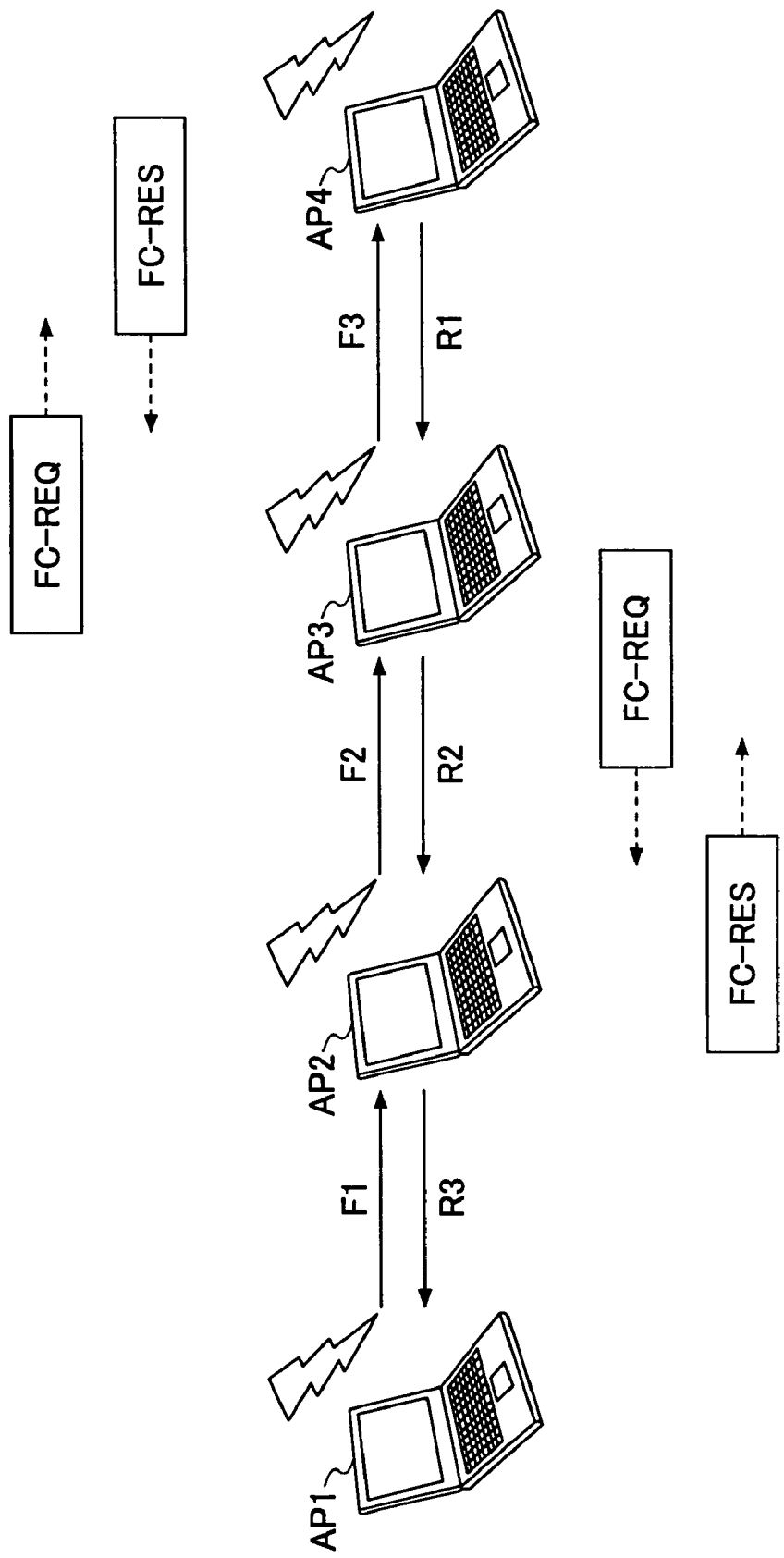
FIG. 22 shows an example of a signaling mechanism by means of unicast.

Unicast (1) has an advantage of ensuring the transmission of the signal controlling the transmission rate to the receiver. FIG. 22 shows an example of a signaling mechanism by means of unicast. For example, an access point AP3 sends transmission traffic F3 to an access point AP4 and transmission traffic R2 (in the opposite direction) to an access point AP2, including a FC-Req (Flow Control Request) packet. When the access points AP2 and AP4 receive the FC-Req, they each return a FC-Res (Flow control Response) to the access point AP3. This signaling mechanism by means of unicast can ensure communications with the neighbor nodes. However, if the number of nodes associated with the relay node increases, the number of unicast packets is expected to be increased, which may cause degradation in the wireless bandwidth (throughput).

Figure 23:
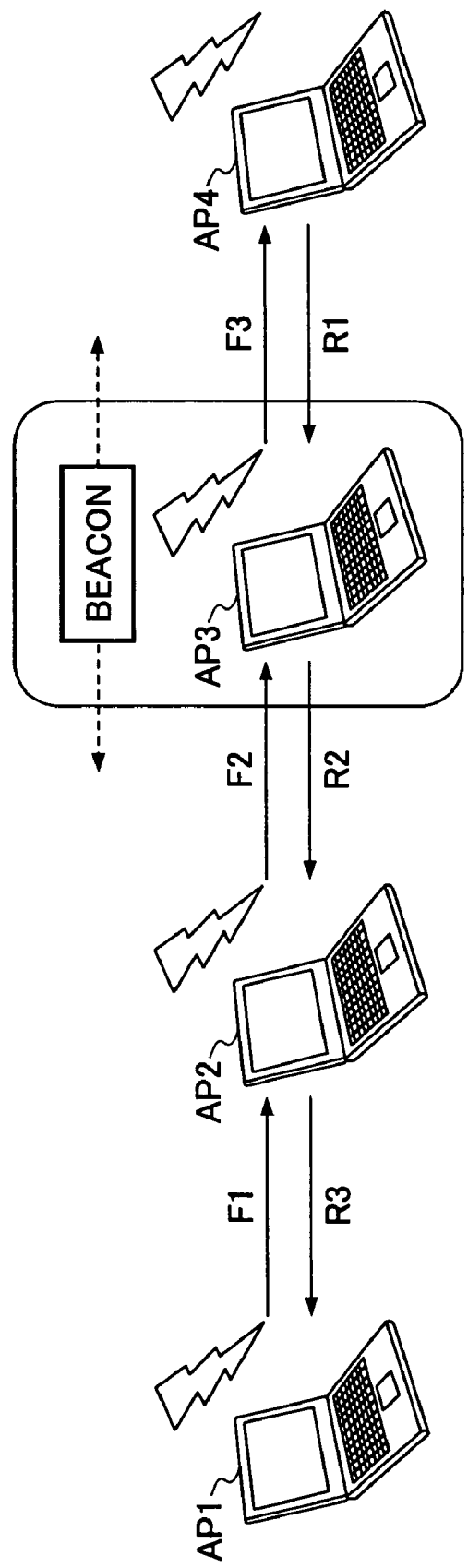
FIG. 23 shows an example of a signaling mechanism by means of a beacon.

FIG. 23 shows an example of a signaling mechanism by means of a beacon, in which flow control signaling is achieved by adding a new element to the beacon packet broadcast periodically. This signaling mechanism is achieved easily, because it adds the new element to the packet instead of defining a new packet for flow control. However, this signaling mechanism has disadvantages in that reliability will be reduced due to broadcasting and flow control for a short period cannot be achieved due to periodic broadcasting.

Figure 24:
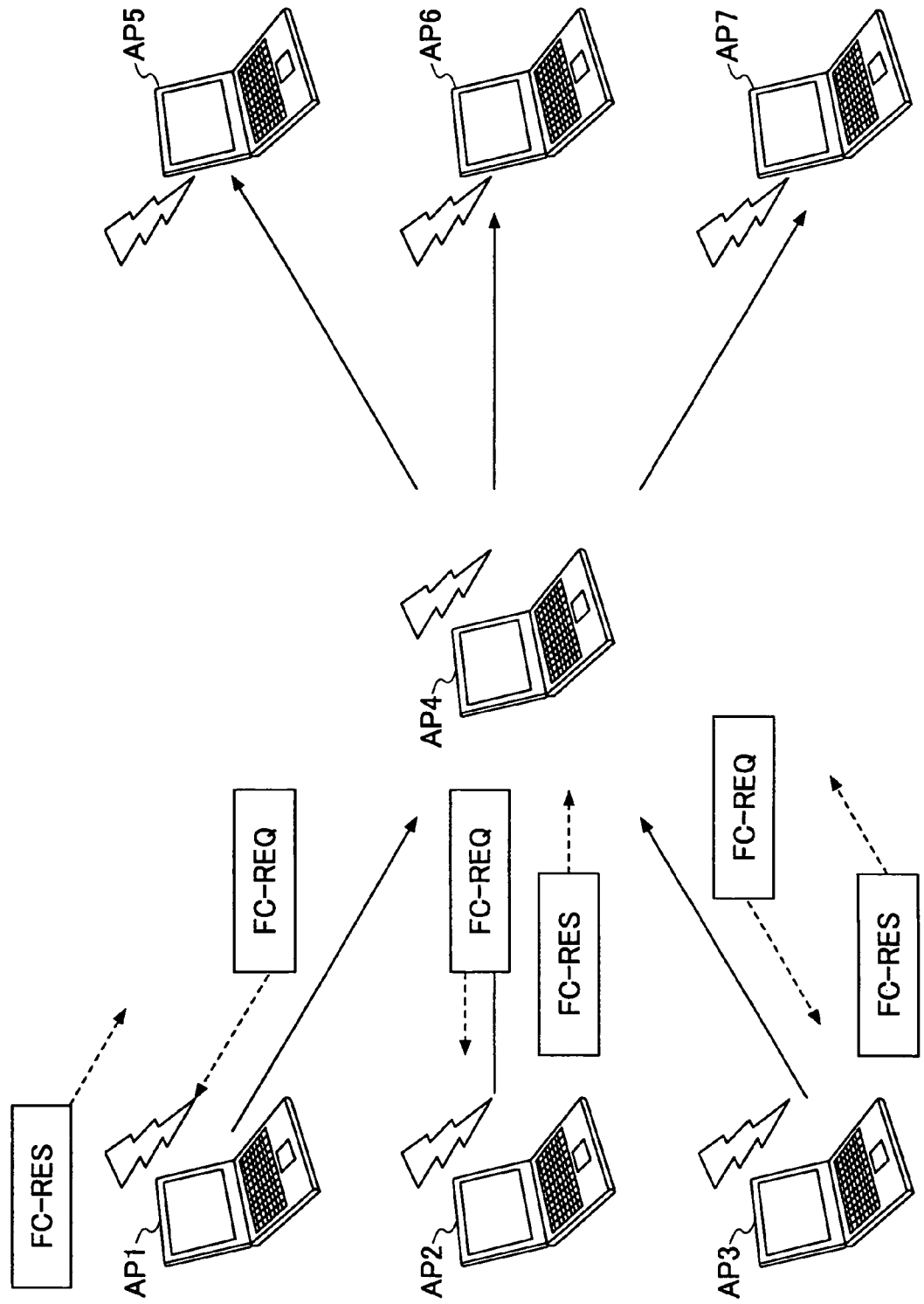
FIG. 24 shows an example of a signaling mechanism in a star topology.

FIG. 24 shows an example of a signaling mechanism in a star topology, in which FC-Req (Flow Control Request) packets are transmitted from a relay access point AP4 to access points AP1-AP3 attempting to send data to this access point AP4.

FIG. 25-FIG. 28 show example frames used for flow control. Each of the frames has the example element included in a packet, and can be applied to both the mechanisms by means of unicast and the mechanisms by means of the beacon.

Figure 25:
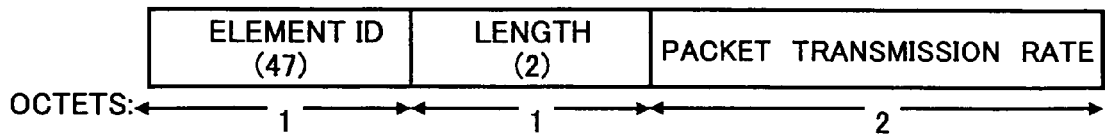
FIG. 25 shows an example packet for flow control.
Figure 26:
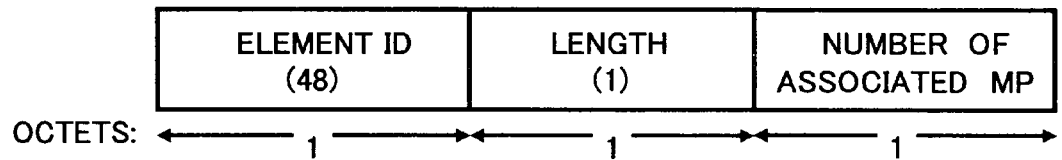
FIG. 26 shows another example packet for flow control.
Figure 27:
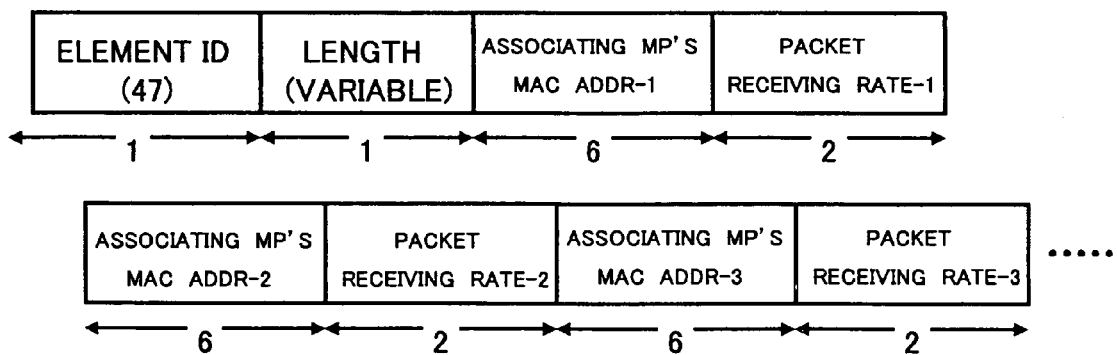
FIG. 27 shows another example packet for flow control.
Figure 28:
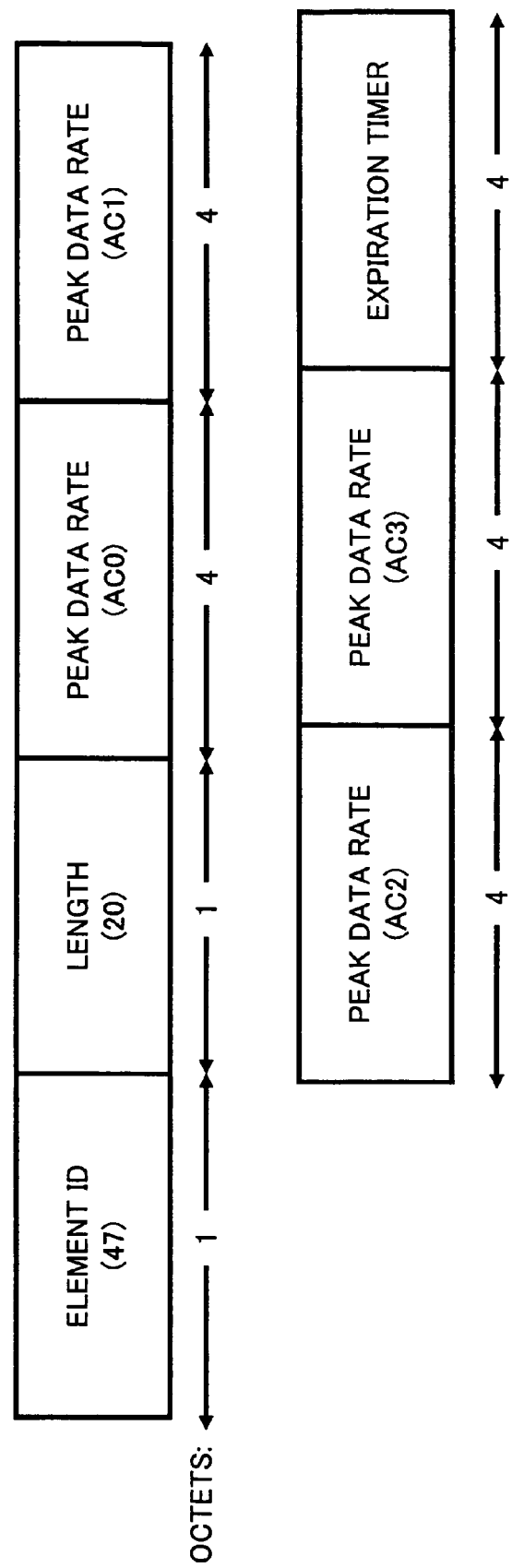
FIG. 28 shows yet another example packet for flow control.

A packet shown in FIG. 25 has an Element ID, a length of the payload (Length) and the amount of data transmission (Packet Transmission Rate), which are elements used for transmitting the amount of data transmission in the access point to the neighbor node. A packet shown in FIG. 26 has an Element ID, a length of the payload (Length) and the number of associated nodes (Number of associated MP (Mesh Point)), which are elements used for transmitting the number of associated nodes to the neighbor node, as additional information. A packet shown in FIG. 27 has an Element ID, a length of the payload (Length), an identifier for links (Associated MP's MAC Address), and the amount of received data (Packet receiving rate), which shows the amount of data received by the node for each link. FIG. 28 shows an example element including a Peak Data Rate for each priority AC (Access Category) of QoS. The packet shown in FIG. 28 further includes an Expiration Timer which indicates the time when the node receiving the Flow Control Request packet should control transmission traffic.

Figure 29:
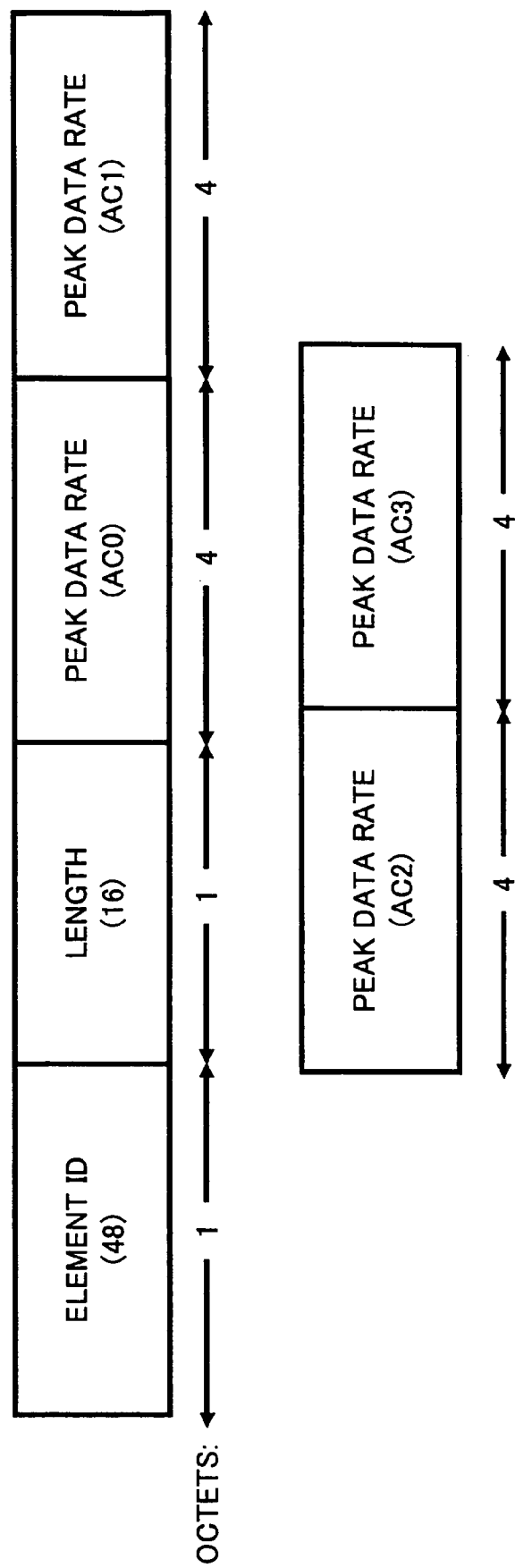
FIG. 29 shows an example ACK packet for flow control.

Typically, the Flow Control Response is just an ACK (AC-Knowledgement) packet. In addition, the Flow Control Response may include the amount of requested transmission traffic (Offered Load). Also, the the amount of requested transmission traffic may be transmitted after being categorized into each priority of QoS. In this case, the access point which has the larger amount of requested transmission traffic can be given a higher priority for transmitting data. FIG. 29 shows an example element indicating the amount of requested transmission traffic for each AC, which can be included in the ACK packet.

Figure 30:
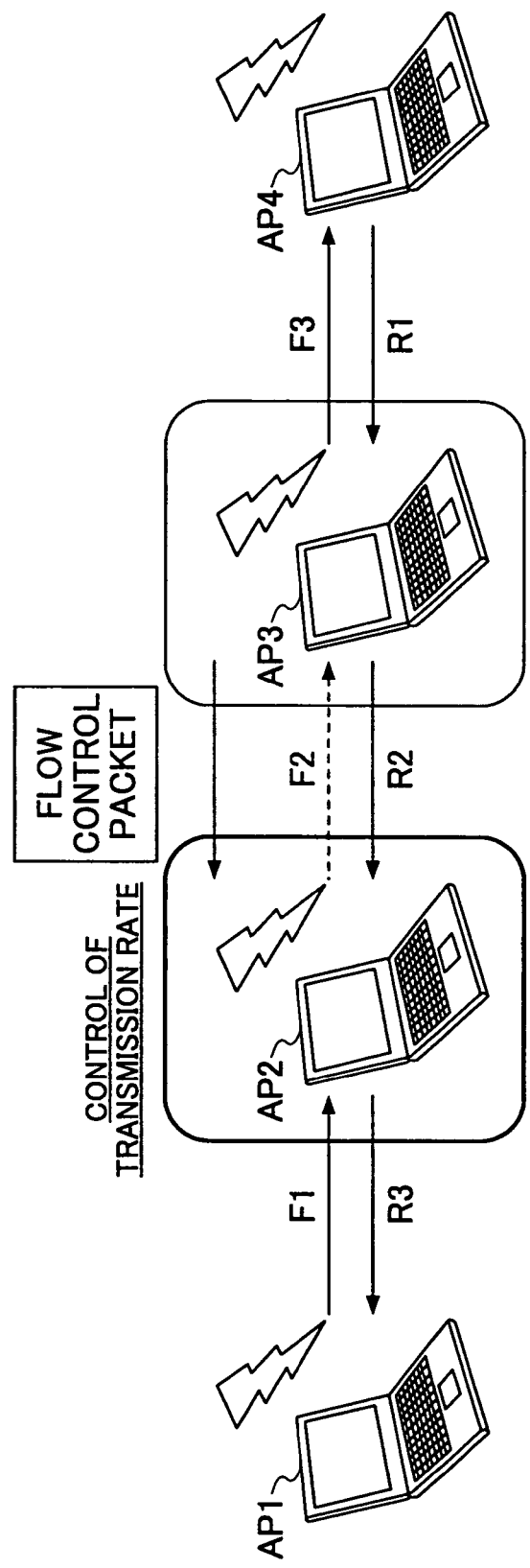
FIG. 30 shows an example of the control of Packet Transmission Rate.

In the following, the control of Packet Transmission Rate in the node which receives the above-mentioned packet for flow control is described. It is noted that the sending procedures for the control of Packet Transmission Rate by means of unicast are different from those by means of a beacon, but receiving procedures are the same. With reference to FIG. 30, the control of Packet Transmission Rate is described based on the signaling mechanism by means of unicast.

FIG. 30 shows an example of the control of Packet Transmission Rate. An access point AP2 controls the transmission rate, using information on the amount of transmission traffic and the number of associated nodes included in a flow control packet received from an access point AP3. For example, when "Offerd Load" in the frame indicates "6 Mbps" and "Number of associated MP on the receiving side" indicates "2", transmission traffic in the access point AP2 should be 3 Mbps (6 Mbps/2) or less. If transmission traffic is above 3 Mbps, the amount of buffered data in the access point AP3 will be increased. For this reason, the access point AP2 increments the value of AIFSN, in order to decrease transmission traffic. On the other hand, if transmission traffic is below 3 Mbps, for the access point AP2 it is possible to decrement the value of AIFSN in response to the request from an application, so as to increase transmission traffic. Instead of changing the value of AIFSN, CWmin and/or TXOP Limit may be changed in order to decrease or increase Packet Transmission Rate. In case of changing CWmin and/or TXOP Limit, Packet Transmission Rate can be decreased or increased significantly, compared to changing AIFSN. On the other hand, the control of Packet Transmission Rate using AIFSN can be more moderate than the control using CWmin and/or TXOP Limit. It is noted that AIFSN, CWmin and/or TXOP Limit can be controlled using buffer usage included in the flow control packet. For example, when the buffer usage becomes above half of the buffer capacity while the Packet Transmission Rate at the relay node included in the flow control packet remains below its threshold, it is possible to increase AIFSN and/or CWmin and decrease TXOP Limit to prevent buffer overflow.

CONCLUSION

As described above, the access point according to the present invention acquires the number of stations within the coverage area, the number of neighbor nodes, and the amount of buffered data, as information on the amount of data relay processing in the own access point (and the other access points, if necessary). Based on the information, the access point calculates the transmission priority and determines the priority related parameter (CW, AIFSN and/or TXOP Limit) for data transmission. As a result, it is possible to prevent buffer overflow in the access point acting as a relay node that is likely to have the larger amount of data to be processed, and to improve throughput within the whole system. For example, the present invention can be applied to VoIP (Voice over Internet Protocol) which requires high capacity and short delay, in order to improve performance within the network. VoIP is expected to be used as an application within the wireless ad-hoc network system.

In addition, the access point according to the present invention controls the priority related parameter and does not change its data transmission protocol itself. For this reason, the access point applying the present invention can communicate with an access point that does not apply the present invention. That is, the access point according to the present invention has backward compatibility.

The description of the embodiments of the present invention is given above for the understanding of the present invention. It will be understood that the invention is not limited to the particular embodiments described herein, but is capable of various modifications, rearrangements and substitutions as will now be apparent to those skilled in the art without departing from the scope of the invention. Therefore, it is intended that the following claims cover all such modifications and changes that fall within the true spirit and scope of the invention.

The present application is based on Japanese Priority Applications No. 2004-254595 filed on Sep. 1, 2004 and No. 2005-156395 filed on May 27, 2005 with the Japanese Patent Office, the entire contents of which are hereby incorporated by reference.

What is claimed is:

1. A wireless communication device, comprising:
    a transceiver configured to transmit information related to an amount of buffer data in the wireless communication device to a neighbor wireless communication device together with a signal requesting transmission rate control, and receive information related to an amount of buffer data in the neighbor wireless communication device from the neighbor wireless communication device; and
    a controller configured to control a transmission rate based on the information related to the amount of buffer data in the neighbor wireless communication device,
    wherein the information related to the amount of buffer data in the wireless communication device transmitted to the neighbor wireless communication device is categorized according to a priority of a quality of service and the categorized information for each priority is included in the signal requesting transmission rate control.

2. The wireless communication device of claim 1, wherein the transceiver is configured to receive the information related to the amount of buffer data in the neighbor wireless communication device from the neighbor wireless communication device together with a signal requesting transmission rate control.

3. The wireless communication device of claim 1, wherein the controller is configured to control the transmission rate based on the received information categorized according to the priority of the quality of service.

4. The wireless communication device of claim 1, wherein the controller is configured to control the transmission rate by changing at least one of a parameter defining a predetermined period to wait before transmitting a packet and a parameter defining a duration for which the wireless communication device transmits data packets continuously.

5. The wireless communication device of claim 1, wherein the information related to the amount of buffer data includes time information related to transmission rate control.

6. A congestion control method performed by a wireless communication device, the method comprising:
    transmitting, from a transceiver of the wireless communication device, information related to an amount of buffer data in the wireless communication device to a neighbor wireless communication device together with a signal requesting transmission rate control;
    receiving, at the transceiver of the wireless communication device, information related to an amount of buffer data in the neighbor wireless communication device from the neighbor wireless communication device; and
    controlling a transmission rate based on the information related to the amount of buffer data in the neighbor wireless communication device,
    wherein the information related to the amount of buffer data in the wireless communication device transmitted to the neighbor wireless communication device is categorized according to a priority of a quality of service and the categorized information for each priority is included in the signal requesting transmission rate control.

7. The method of claim 6, wherein the receiving includes receiving the information related to the amount of buffer data in the neighbor wireless communication device from the neighbor wireless communication device together with a signal requesting transmission rate control.

8. The method of claim 6, wherein
the transmission rate is controlled based on the received information categorized according the priority of the quality of service.

9. The method of claim 6, further comprising:
controlling the transmission rate by changing at least one of a parameter defining a predetermined period to wait before transmitting a packet and a parameter defining a duration for which the wireless communication device transmits data packets continuously.

10. The method of claim 6, wherein the information related to the amount of buffer data includes time information related to transmission rate control.

11. A wireless communication device, comprising:
means for transmitting information related to an amount of buffer data in the wireless communication device to a neighbor wireless communication device together with a signal requesting transmission rate control;
means for receiving information related to an amount of buffer data in the neighbor wireless communication device from the neighbor wireless communication device; and
means for controlling a transmission rate based on the information related to the amount of buffer data in the neighbor wireless communication device,
wherein the information related to the amount of buffer data in the wireless communication device transmitted to the neighbor wireless communication device is categorized according to a priority of a quality of service and the categorized information for each priority is included in the signal requesting transmission rate control.

12. An ad-hoc wireless network, comprising:
a plurality of wireless communication devices, wherein each wireless communication device comprises:
a transceiver configured to transmit information related to an amount of buffer data to a neighbor wireless communication device together with a signal requesting transmission rate control, and receive information related to an amount of buffer data in the neighbor wireless communication device from the neighbor wireless communication device; and
a controller configured to control a transmission rate based on the information related to the amount of buffer data in the neighbor wireless communication device,
wherein the information related to the amount of buffer data in the wireless communication device transmitted to the neighbor wireless communication device is categorized according to a priority of a quality of service and the categorized information for each priority is included in the signal requesting transmission rate control.

* * * * *